United States Patent [19]
Chari et al.

[11] Patent Number: 6,058,445
[45] Date of Patent: May 2, 2000

[54] DATA MANAGEMENT METHOD FOR ADDING OR EXCHANGING COMPONENTS ON A RUNNING COMPUTER

[75] Inventors: Srikumar N. Chari, Cupertino; Kenny L. Bright, Hayward; Bruno Sartirana, Sunnyvale, all of Calif.

[73] Assignee: Micron Electronics, Inc., Nampa, Id.

[21] Appl. No.: 08/942,124

[22] Filed: Oct. 1, 1997

Related U.S. Application Data

[60] Provisional application No. 60/046,310, May 13, 1997.

[51] Int. Cl.$^7$ .................................................. G06F 13/00
[52] U.S. Cl. ........................... 710/103; 710/102; 710/10; 710/16; 709/223; 709/227
[58] Field of Search ...................................... 395/281–283, 395/828–838, 500, 613, 200.55, 200.56, 681; 364/514 A, 514 B, 514 C, 514 R, 240, 240.1; 709/223, 225, 227, 229; 710/5, 6, 36, 37, 62

[56] References Cited

U.S. PATENT DOCUMENTS

| | | | |
|---|---|---|---|
| 4,999,787 | 3/1991 | McNally et al. | 364/514 |
| 5,123,017 | 6/1992 | Simpkins et al. | 371/15.1 |
| 5,210,855 | 5/1993 | Bartol | 395/500 |
| 5,261,044 | 11/1993 | Dev et al. | 345/357 |
| 5,272,584 | 12/1993 | Austruy et al. | 631/58 |
| 5,337,413 | 8/1994 | Lui et al. | 395/275 |
| 5,340,340 | 8/1994 | Hastings et al. | 439/64 |
| 5,379,409 | 1/1995 | Ishikawa | 395/575 |
| 5,386,567 | 1/1995 | Lien et al. | 395/700 |
| 5,471,617 | 11/1995 | Farrand et al. | 395/700 |

(List continued on next page.)

OTHER PUBLICATIONS

IBM Technical Disclosure Bulletin, 35(2):69–74, Jul. 1992, "Serial Channel Synchronizer".

IBM Technical Disclosure Bulletin, 39(7): 229–230, Jul. 1996.

Standard Overview, http://www.pc–card.com/stand_overview.html#1, 9 pages, Jun. 1990. "Detailed Overview of the PC Card Standard."

Digital Equipment Corporation, datasheet, 140 pages, 1993, "DECchip 21050 PCI–TO–PCI Bridge."

NetFRAME Systems Incorporated, *News Release*, 3 pages, referring to May 9, 1994, "NetFRAME's New High–Availability ClusterServer Systems Avoid Scheduled as well as Unscheduled Downtime."

(List continued on next page.)

*Primary Examiner*—Ayaz R. Sheikh
*Assistant Examiner*—Raymond N Phan
*Attorney, Agent, or Firm*—Knobbe, Martens, Olson & Bear, LLP

[57] ABSTRACT

A data management method supports hot plug operations on a computer by defining, organizing, and maintaining hot plug variables which identify components of a computer that may be involved in hot plug operations, and which also identify capabilities and operational states of those components as well as control their operation and interface to the computer. The hot plug variables identify a component as well as represent states and capabilities of a component, and thus the hot plug variables advantageously operate as commands to predetermined components. The method generally selects a plurality of variables to support adding a component to or exchanging components of a computer while the computer runs, and collects in a computer readable medium, hot plug variable data representing capabilities, characteristics or states of components of the computer, the hot plug variable data is related to the plurality of variables. The method supports generating, with management software running on a client computer, requests such as a suspend device driver request, a power off request, a power on request, and a resume device driver request, and sending the requests over a network to agent software running on a server computer, the agent software responsively recognizing the respective requests to suspend a device driver running on the server computer, to stop power to a component of the server computer, to start power to the server computer, and to resume the device driver.

26 Claims, 10 Drawing Sheets

U.S. PATENT DOCUMENTS

| | | | |
|---|---|---|---|
| 5,487,148 | 1/1996 | Komori et al. | 395/182.02 |
| 5,491,796 | 2/1996 | Wanderer et al. | 709/223 |
| 5,513,314 | 4/1996 | Kandasamy et al. | 395/182.04 |
| 5,517,646 | 5/1996 | Piccirillo et al. | 395/700 |
| 5,533,198 | 7/1996 | Thorson | 395/200.15 |
| 5,539,883 | 7/1996 | Allon et al. | 395/200.11 |
| 5,546,595 | 8/1996 | Norman et al. | 395/800 |
| 5,555,510 | 9/1996 | Verseput et al. | 364/514 R |
| 5,561,769 | 10/1996 | Kumar et al. | 395/200.05 |
| 5,564,024 | 10/1996 | Pemberton | 395/283 |
| 5,576,946 | 11/1996 | Bender et al. | 364/146 |
| 5,579,491 | 11/1996 | Jeffries et al. | 395/283 |
| 5,581,712 | 12/1996 | Herrman | 395/283 |
| 5,592,610 | 1/1997 | Chittor | 395/182.02 |
| 5,604,873 | 2/1997 | Fite et al. | 395/283 |
| 5,621,892 | 4/1997 | Cook | 395/200.1 |
| 5,632,021 | 5/1997 | Jennings et al. | 395/309 |
| 5,638,289 | 6/1997 | Yamada et al. | 364/489 |
| 5,644,731 | 7/1997 | Liencres et al. | 395/283 |
| 5,651,006 | 7/1997 | Fujino et al. | 370/408 |
| 5,652,892 | 7/1997 | Ugajin | 395/750 |
| 5,655,081 | 8/1997 | Bonnell et al. | 395/200.32 |
| 5,671,441 | 9/1997 | Glassen et al. | 395/828 |
| 5,678,006 | 10/1997 | Valizadeh et al. | 395/200.02 |
| 5,678,042 | 10/1997 | Pisello et al. | 395/610 |
| 5,684,945 | 11/1997 | Chen et al. | 712/20 |
| 5,689,637 | 11/1997 | Johnson et al. | 395/182.22 |
| 5,696,486 | 12/1997 | Poliquin et al. | 340/506 |
| 5,710,908 | 1/1998 | Man | 395/500 |
| 5,745,897 | 4/1998 | Perkins et al. | 707/101 |
| 5,748,098 | 5/1998 | Grace | 340/825.16 |
| 5,751,575 | 5/1998 | Hirosawa et al. | 364/188 |
| 5,751,933 | 5/1998 | Dev et al. | 395/182.02 |
| 5,754,426 | 5/1998 | Dumais | 364/188 |
| 5,758,103 | 5/1998 | Oh | 395/283 |
| 5,761,085 | 6/1998 | Giorgio | 702/333 |
| 5,761,429 | 6/1998 | Thompson | 395/200.54 |
| 5,764,911 | 6/1998 | Tezuka et al. | 395/200.53 |
| 5,764,913 | 6/1998 | Jancke et al. | 395/200.54 |
| 5,768,541 | 6/1998 | Pan-Ratzlaff | 395/283 |
| 5,774,667 | 6/1998 | Garvey et al. | 395/200.52 |
| 5,781,798 | 7/1998 | Beatty et al. | 395/830 |
| 5,784,576 | 7/1998 | Guthrie et al. | 395/283 |
| 5,787,246 | 7/1998 | Litchtman et al. | 395/200.5 |
| 5,802,146 | 9/1998 | Dulman | 379/34 |
| 5,812,750 | 9/1998 | Dev et al. | 395/182.02 |
| 5,815,652 | 9/1998 | Ote et al. | 395/183.07 |
| 5,826,046 | 10/1998 | Nguyen et al. | 710/129 |
| 5,838,319 | 11/1998 | Guzak et al. | 345/340 |
| 5,862,333 | 1/1999 | Graf | 395/200.53 |
| 5,901,304 | 5/1999 | Hwang et al. | 395/500 |
| 5,907,610 | 5/1999 | Onweller | 379/242 |
| 5,910,954 | 6/1999 | Bronstein et al. | 370/401 |
| 5,913,037 | 6/1999 | Spofford et al. | 709/226 |
| 5,922,051 | 7/1999 | Sidey | 709/202 |
| 5,944,782 | 8/1999 | Noble et al. | 709/202 |

OTHER PUBLICATIONS

Compaq Computer Corporation, Phenix Technologies, LTD, and Intel Corporation, specification, 55 pages, May 5, 1995, "Plug & Play BIOS Specification."

NetFRAME Systems Incorporated, datasheet, Feb. 1996, "NF450FT Network Mainframe."

NetFRAME Systems Incorporated, datasheet, Mar. 1996, "NetFRAME Cluster Server 8000."

Joint work by Intel Corporation, Compaq, Adaptec, Hewlett Packard, and Novell, presentation, 22 pages, Jun. 1996, "Intelligent I/O Architecture."

Lockareff, M., HTINews, http://www.hometoys.com/htinews/dec96/articles/loneworks.htm, Dec. 1996, "Loneworks—An Introduction."

Schofield, M.J., http://www.omegas.co.uk/CAN/canworks.htm. Copyright 1996, 1997, "Controller Area Network—How CAN Works."

NRTT, Ltd., http://www.nrtt.demon.co.uk/cantech.html, 5 pages, May 28, 1997, "CAN: Technical Overview."

PCI Special Interest Group, specification, 35 pages, Draft For Review Only, Jun. 15, 1997, "PCI Bus Hot Plug Specification."

Microsoft Corporation, file:///A=/Rem devs.htm, 4 pages, Copyright 1997, updated Aug. 13, 1997, "Supporting Removable Devices Under Windows and Windows NT."

DATA MANAGEMENT METHOD FOR ADDING OR EXCHANGING COMPONENTS ON A RUNNING COMPUTER

RELATED APPLICATIONS

The subject matter of U.S. Patent Application entitled "Data Management System Supporting Hot Plug Operations On A Computer," filed on Oct. 1, 1997, Application No. 08/942,129, and having attorney Docket No. MNFRAME.030A is related to this application.

PRIORITY CLAIM

The benefit under 35 U.S.C. §119(e) of the U.S. provisional application serial no. 60/046,310, entitled "High Performance Network Server System Management Interface," and filed on May 13, 1997, is hereby claimed.

APPENDICES

Appendix A, which forms a part of this disclosure, is a list of commonly owned copending U.S. patent applications. Each one of the applications listed in Appendix A is hereby incorporated herein in its entirety by reference thereto.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention relates to the field of computers and computer software. In particular, the invention relates to managing configurations of computers.

BACKGROUND OF THE INVENTION

In response to organizations' increasing reliance on network-based server computers and the increasing cost of computer downtime, manufacturers developed fault tolerant or redundant systems designed to reduce downtime. Such systems typically use memory back up and redundant components in attempting to provide continuous system operation. Many redundant systems can be found in the prior art.

For example, U.S. Pat. No. 4,607,365 to Greig, et al., discloses a system that automatically selects secondary components as needed to compensate for faults in the system. Similarly, U.S. Pat. No. 4,727,516 to Yoshida, et al. discloses redundant memory arrays and U.S. Pat. Nos. 4,484,275 and 4,378,588 to Katzman et al. teach multiple processors. While those redundant computer systems may prevent a complete server failure in some cases, those systems do not address many causes of computer downtime.

Studies show that a significant percentage of network server downtime is caused by transient faults in the I/O subsystem. These faults may be due, for example, to adapter card firmware, or hardware which does not properly handle concurrent errors, and often causes servers to crash or hang. Diagnosing intermittent errors can be a frustrating and time-consuming process. The result is hours of downtime per failure, while a system administrator discovers the failure, takes some action, and manually reboots the server. The computer systems of the prior art do not provide a computer system manager with the tools needed to keep computers running while failed parts are removed and repaired or while upgrades are performed.

Moreover, even if hardware components of a server computer can withstand being added or removed without shutting down the server computer or making it unavailable, a system manager could not simply remove a piece of hardware and plug in another piece without causing immense disruption of the software. Such a physical swap would cause hundreds or thousands of error conditions every few seconds, likely resulting in corruption of data and possibly even systemwide software failure. Low level software modules, particularly device drivers, must be carefully administered during any change to the hardware components they service. Making matters more difficult, device drivers are among the most complicated and least understood classes of software, few of them alike, but nearly all having arbitrary and arcane command sets.

Without some tool to provide guidance and uniformity, network administrators could only add or remove components to an operating computer by issuing precise sequences of arcane, error-prone commands having difficult-to-remember, numeric-range parameter values, interspersed with a variety of hardware manipulations, with little or no feedback during the entire process to indicate successful progress. Moreover, completely different sets of commands and parameter values may be required to perform hot plug operations on differing components, or on similar components from differing vendors. Both the high possibility of making mistakes and the steep learning curve make manual performance of hot plug operations impractical at best.

Industry focus and cooperation on computer system management has prompted the development of standards for performing routine management operations on computers. Today's standards generally provide databases containing a wide variety of management information needed to carry out many computer system management tasks. While the standard practices used to manage computers are becoming more uniform and effective as growing numbers of computer system managers learn, implement and improve these standards, there has been little if any focus on the area of adding or removing components to a running, operating computer.

SUMMARY OF THE INVENTION

One embodiment of the present invention is a method for managing the configuration of a computer. The method comprises the acts of (1) extending a management information base module to include a plurality of variables, the variables are selected to support adding a component to the computer while the computer runs, removing a component from the computer while the computer runs, and exchanging components of the computer while the computer runs, the management information base is stored on a computer readable medium; (2) compiling the management information base module to generate a binary MIB; and (3) generating a hot plug MIB table on a computer readable medium, the hot plug MIB table including variable data corresponding to variables defined in the MIB, the variable data representing capabilities, characteristics or states of components of the computer.

Another embodiment of the present invention is a method for managing hot plug data to hot add or hot swap components of a computer. The method comprises the acts of: (1) selecting a plurality of variables, the variables selected to support adding a component to the computer while the computer runs, removing a component from the computer while the computer runs, and exchanging components of the computer while the computer runs, the variables stored on a computer readable medium; and (2) collecting in a computer readable medium, hot plug variable data representing capabilities, characteristics or states of components of the computer, the hot plug variable data related to the plurality of variables.

A further embodiment of the present invention method for refreshing hot plug variables. The hot plug variables are stored in a computer readable medium of a client computer. The hot plug variables include existing component variable data identifying at least one component of a server computer. The method comprises the acts of (1) polling, at a predetermined time interval, at least one component of the server computer for new component variable data identifying the at least one component of the server computer; and (2) refreshing the hot plug variables by storing the new component variable data in the computer readable medium of the client computer to supersede said existing component variable data.

A still further embodiment of the present invention is a method for making hot plug variables available to a software module on a computer. The hot plug variables are defined by a hot plug MIB. The method comprises the acts of: (1) storing on computer readable media on the computer, a binary hot plug MIB, the binary hot plug MIB generated by compiling with a MIB compiler a hot plug MIB module, the hot plug MIB module defining hot plug variables selected to support adding a component to a computer while the computer runs, removing a component from the computer while the computer runs, and exchanging components of the computer while the computer runs, the hot plug variables including a power state variable for regulating the power state of at least one component of the computer and also including a component state variable for suspending or resuming the operation of at least one component of the computer; and (2) accessing, with software running on the computer, data in the binary hot plug MIB. Advantageously, the embodiment may comprise the further acts of (1) storing the binary hot plug MIB on a second computer linked to the first computer by a network; and (2) accessing data in the binary hot plug MIB with software running on the second computer which controls hot plug operations performed on the first computer.

Another embodiment of the present invention is a method for controlling, from a client computer, hot plug operations performed on a server computer. The method comprises the acts of (1) preparing a hot plug MIB module defining hot plug MIB variables; (2) compiling the hot plug MIB module to generate a binary MIB module; (3) distributing the binary MIB module to a computer readable medium of the client computer and to a computer readable medium of the server computer; (4) polling components of the server computer to generate server-based hot plug MIB variable data stored on a computer readable medium of the server computer, the server-based hot plug MIB variable data related to the hot plug MIB variables defined in the hot plug MIB module; (5) refreshing client-based hot plug MIB variable data stored on a computer readable medium of the client computer by sending to the client computer the server-based hot plug MIB variable data; (6) generating with management software running on the client computer, a suspend device driver request related to a component state variable defined by the MIB module; (7) sending the suspend device driver request to agent software running on the server computer, the agent software responsively recognizing the suspend device driver request to suspend a device driver servicing a component of the server computer; (8) generating with management software running on the client computer, a power off request related to a power state variable defined by the MIB module; (9) sending the power off request to the agent software, the agent software responsively recognizing the power off request to stop power to a component of the server computer; (10) generating with management software running on the client computer, a power on request related to a power state variable defined by the MIB module; (11) sending the power on request to the agent software, the agent software responsively recognizing the power off request to start power to a component of the server computer; (12) generating with management software running on the client computer, a resume device driver request related to a component state variable defined by the MIB module; and (13) sending the resume device driver request to agent software running on the server computer, the agent software responsively recognizing the resume device driver request to resume the device driver.

Still another embodiment of the present invention is a method for updating hot plug data for a component connected to a computer. The method comprises the acts of: (1) preparing a MIB module defining hot plug variables for a class of components capable of connecting to a computer; (2) compiling the MIB module to generate a binary hot plug MIB; (3) connecting a component of the class of components to the computer; (4) preparing hot plug MIB variables in a computer readable medium of the computer, the hot plug MIB variables corresponding to the class of components; (5) polling the component to obtain hot plug MIB variable data for the component; and (6) updating the hot plug MIB variables to contain the obtained hot plug MIB variable data.

These and other embodiments of the present invention will be readily apparent to those skilled in the art having reference to the detailed description and drawings which follow, the invention not being limited, however, to any particular embodiments disclosed.

DETAILED DESCRIPTION OF THE INVENTION

Figure 1:
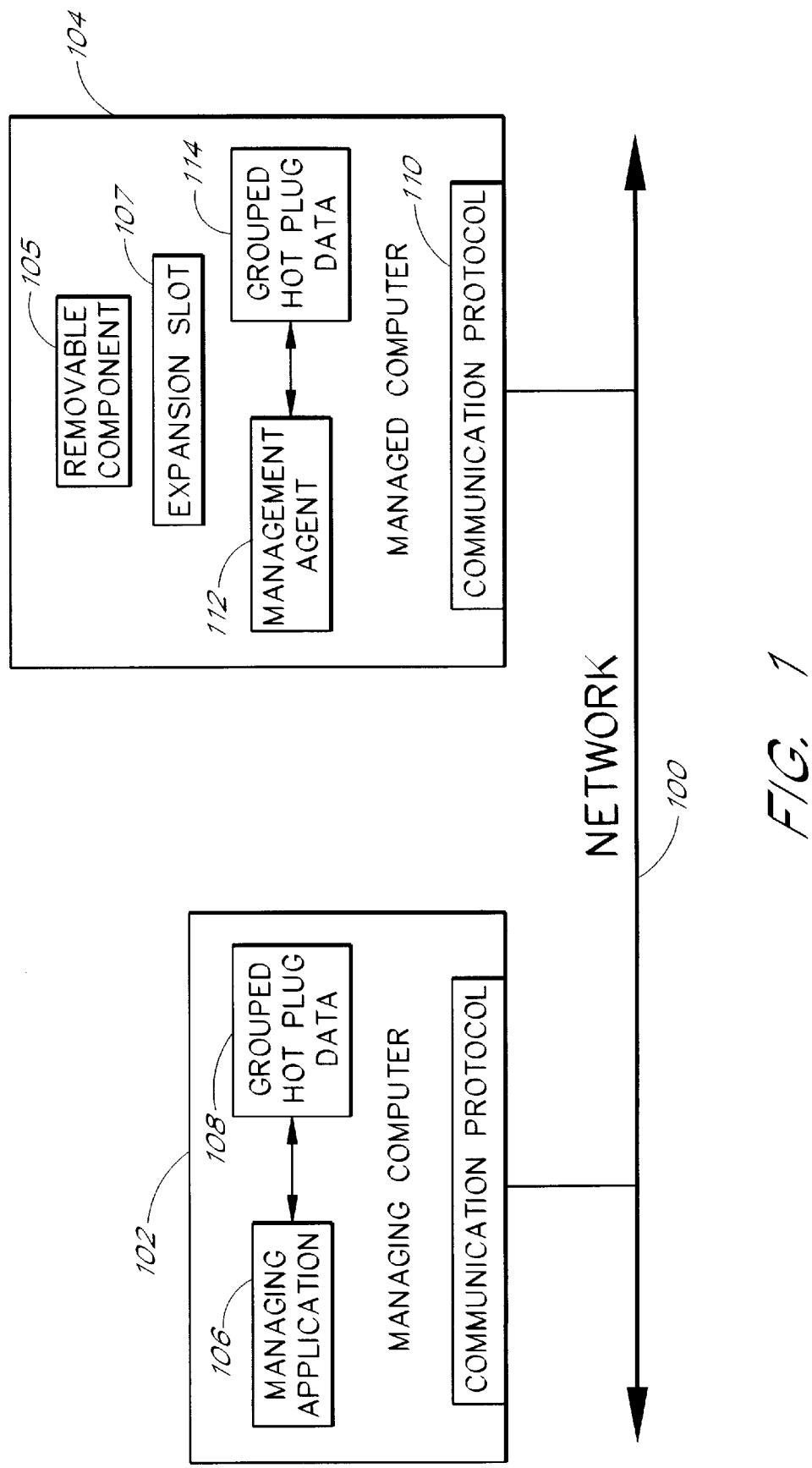
FIG. 1 illustrates a block diagram of a network having a managing computer and a managed computer.

Administrators of centralized server computers need a way to remove failed server components and add functioning components without shutting the servers down. Further, computer system administrators need databases of component information and related management tools to insulate them from the complexities of low level software and to make component add and remove operations uniform, practical and risk free.

The present invention concerns software tools to manage server computers. In particular, the present invention is directed to selecting, acquiring, and maintaining groups of data values for adding or removing components of a computer while that computer is running. The groups of data values permit system managers using system management software tools to identify components of a server computer as well as the capabilities of those components, and also to control the operation of the components and their interface to the server computer.

Generally, the groups of data values correspond to characteristics, capabilities or states of components of a managed server computer which may be added to or removed from a running computer. These components include, but are not limited to, processors, memory, expansion cards, expansion slots, adapter cards, cooling fans, keyboards, monitors, pointing devices, power supplies, I/O ports, floppy disk drives, hard disk drives, cd-rom drives, device drivers, and data files. The characteristics, capabilities or states of certain components may need to be tested, examined or altered by system management software or agent software during a "hot plug" operation. Hot plug operations include hot add operations (i.e., a new component is added to the managed computer without shutting it down, making it unavailable to a user, or halting its execution of instructions) and hot swap operations (i.e., a component is removed and optionally replaced by another component without shutting down the managed computer, making it unavailable to users, or halting its execution of instructions).

The present invention permits a network administrator to manage and control the process of adding and removing computer components while a computer is running. The present invention supports hot plug operations by defining, organizing, and maintaining hot plug variables which identify components of a computer that may be involved in hot plug operations, and which also identify capabilities and operational states of those components as well as control their operation and interface to the computer. Grouping the hot plug variables according to particular components provides efficient access by software modules to convenient subsets of hot plug variables which may be needed to manipulate the operation of a component during a particular hot plug operation. Because the hot plug variables both identify a component as well as represent states and capabilities of a component, the hot plug variables advantageously operate as commands to predetermined components.

In one embodiment, groups of hot plug variables representing components of one computer may be stored in a computer readable medium on a remote computer. By forming requests and commands from the groups of hot plug variables, and by sending these over a network (or some other communication means) to a responsive process running on the first computer, the remote computer advantageously controls hot plug operations on the first computer.

A remote computer, in one embodiment, advantageously retrieves current hot plug variables from another computer by executing, at predetermined time intervals, a retrieve data routine designed to request, retrieve and store hot plug variables. The remote computer thereby maintains current information regarding the status and capabilities of components in a managed computer. In an alternative embodiment, software on a managed computer polls the components of that computer to collect hot plug variable data, stores the hot plug variable data in computer readable media, and, either at predetermined time intervals, or upon sensed configuration changes, causes the hot plug variables to be broadcast to one or more remote computers.

Advantageously, the present invention is consistent with and may extend standard processes widely used to perform computer management tasks. In one such embodiment, the present invention advantageously leverages existing software management tools by defining and organizing hot plug variables according to a hierarchical data storage model called a management information base (MIB). Using the widely implemented MIB model to define and organize hot plug variables allows the present invention to support hot plug operations independent of any particular operating system or computer environment and also facilitates performing hot plug operations remotely, over a network.

Computer management software tools complying with SNMP (Simple Network Management Protocol) standards use MIB-based variables to cooperate in managing computers. These software tools routinely operate over a network, with management software running on a client computer issuing management-related requests to responsive agent software running on a server, and with MIB variables forming the basis of each such request. Thus, extending a MIB to define and organize hot plug MIB variables expands the scope of operations which SNMP management software can control and with which SNMP agent software can cooperate.

In the following description of the invention, a module includes, but is not limited to, software or hardware components which perform certain tasks. Thus, a module may include object-oriented software components, class components, procedures, subroutines, data structures, segments of program code, drivers, firmware, microcode, circuitry, data, data structures, tables, arrays, etc. In addition, those with ordinary skill in the art will recognize that a module can be implemented using a wide variety of different software and hardware techniques.

FIG. 1 illustrates a network 100 that enables a managing computer 102 to exchange data with a managed computer 104. The managed computer 104 includes a removable component 105 and an expansion slot 107 which can accept an additional component.

A managing application 106 software module runs on the managing computer 102. The managing application 106 maintains grouped hot plug data 108 corresponding to characteristics, capabilities or states of components of the managed computer 104. Periodically, the managing application 106 sends a request over the network 100, formatted according to communication protocol 110, to the managed computer 104 seeking current hot plug data.

A management agent 112 software module running on the managed computer 104 receives requests for hot plug data from the network 100. One or more hot plug data acquisition routines in the management agent 112 poll or query various components of the managed computer 104 and interact with device drivers installed on the managed computer 104 to acquire grouped hot plug data 114. The management agent 112 sends the requested current hot plug data values, formatted in accordance with the communication protocol 110, to the managing computer 102. The managing application 106 receives current hot plug data values from the managed computer 104 over the network 100.

A network administrator uses the managing application 106 to control and carry out hot plug (hot add or hot swap) operations performed on the managed computer 104. In preparing to perform a hot plug operation, the network administrator invokes a component browse routine of the managing application 106. The component browse routine extracts data from the grouped hot plug data 108 to display on a computer screen of the managing computer 102 a representation of the removable component 105 and the expansion slot 107 of the managed computer 104.

To perform a hot add operation, the network administrator selects (using a mouse pointer, for example) the displayed representation of the expansion slot 107 of the managed computer 104 and invokes a hot add routine of the managing application 106. The hot add routine accesses the grouped hot plug data 108 to obtain information about the expansion slot 107 such as, for example, its power state (whether power is currently being supplied to the expansion slot 107) and the location of the expansion slot 107 (e.g., one or more identifiers permitting software on the managed computer 104 to unambiguously direct commands to the expansion slot 107).

The hot add routine of the managing application 106 generates and sends, if needed, a request to the managed computer 104 to shut down power to the expansion slot 107. The management agent 112 receive the request over the network 100, shuts down power to the expansion slot 107, verifies the successful completion of the operation and sends response information over the network 100 to the managing computer 102 indicating the successful completion of the requested operation.

The managing application 106 receives the successful completion information and prompts the network administrator to add a component to the managed computer 104. The network administrator then physically inserts a component into the expansion slot 107 and provides input to the managing application 106 indicating that a component has been added to the managed computer 104.

The hot add routine of the managing application 106 uses the grouped hot plug data 108 concerning the expansion slot 107 to generate and send a request to the managed computer 104 to restore power to the expansion slot 107. The management agent 112 receives the request, performs it and sends information to the managing computer 102 indicating that the request completed successfully.

The network administrator may verify operation of the component added to the management computer 104 by generating and sending requests to the managed computer 104 to query, poll or examine the added component and obtain hot plug data concerning the added component. The management agent 112 receives such requests and polls or queries the added component to obtain information such as, for example, a component name, driver number, vendor ID, device ID, operational state, and whether the component can be hot swapped (removed while the computer is still running). The management agent 112 stores the acquired data concerning the added component in the grouped hot plug data on the managed computer 104 and also sends the acquired data to the managing computer 102 over the network 100.

To perform a hot swap operation, the network administrator determines that the removable component 105 of the managed computer 104 should be replaced with another component. The network administrator's determination may be based on an alert condition that the removable component 105 is malfunctioning. The alert condition may be monitored by the managed computer 104 and communicated by the managed computer 104 to the managing computer 102. To remove and replace the removable component 105, the network administrator invokes a hot swap routine.

The hot swap routine accesses the grouped hot plug data 108 to obtain information about the removable component 105 such as, for example, which I/O expansion slot it may occupy, the power state of that expansion slot, and any device driver (or other software module interfacing with the removable component 105). The hot swap routine of the managing application 106 generates and sends a request to the managed computer 104 to suspend operation of the device driver servicing the removable component 105.

The management agent 112 receives the suspend request over the network 100 and issues a call to suspend the target device driver. The management agent 112 sends a response to the managing computer 102 that the device driver has been successfully suspended. The managing application 106 receives the successful suspension response and, as in the hot add operation, generated and sends a request to the managed computer 104 to shut off power to the I/O expansion slot holding the removable component 105. The management agent 112 receives the request to shut off power, performs the request, and sends a successful completion response to the managing computer 102.

The managing application 106 prompts the network administrator to remove the removable component 105 and replace it. The network administrator removes the removable component 105, replaces it with another component. If the new component requires a device driver different than the one that serviced the removable component 105, the network administrator loads (and, if needed, configures) the required device driver. The network administrator provides input to the managing application 106 indicating that the removable component 105 has been removed and replaced with another component.

The managing application 106 generates and sends a request to the managed computer 104 to restore power to the I/O expansion slot holding the replacement component. The management agent 112 receives the request to restore power, restores the power to the target I/O expansion slot, and sends a successful completion response to the managing computer 102. The managing application 106 generates and sends a request to the managed computer 104 to resume the operation of the suspended driver. The management agent 112 receives the request to resume driver operation, issues a call to the driver to resume its operation (begin servicing the replacement component), and sends to the managing computer 102 a successful completion response.

The managing application 106 requests updated hot plug data from the managed computer 104. The management agent 112 receives requests for updated hot plug data, polls and queries components of the managed computer 104 as needed, and returns (over the network 100) the updated hot plug data to the managing computer 102. The managing application 106 examines the updated hot plug data 108 to verify the normal operation of the replacement component.

In accordance with one embodiment of the present invention, the groups of hot plug data values exist as groups of variables, where each variable has a name or identifier, associated attributes (which may include a data type, a description and status information) and associated operations (e.g., read or write) that can be performed on the variable. Such variables may also be known as managed objects. In this embodiment, a network administrator uses management software to access groups of variables to control hot plug operations performed on managed server computers.

Figure 2:
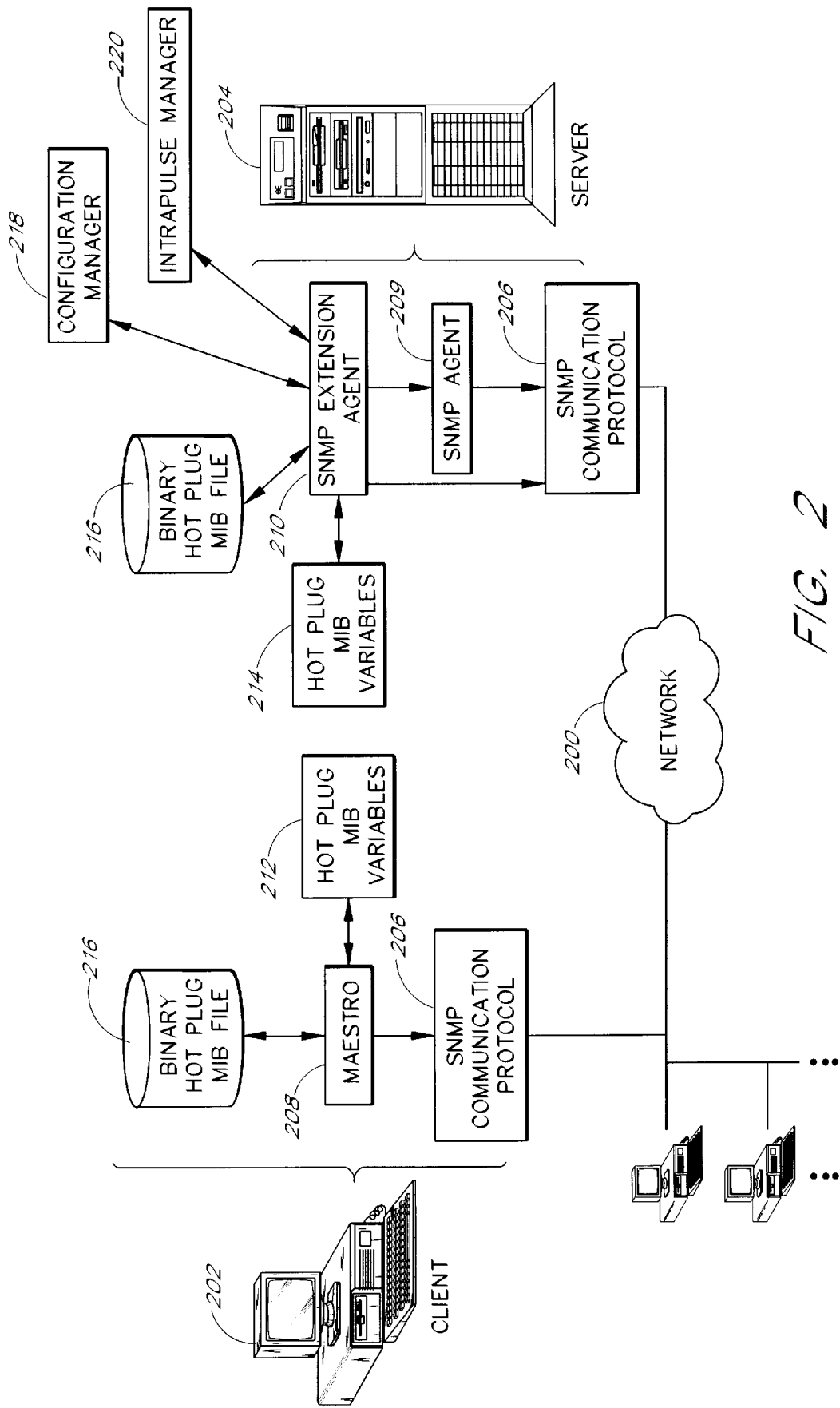
FIG. 2 illustrates a block diagram of a computer network having a client computer and a server computer which communicate to manage the configuration of the server computer.

FIG. 2 illustrates a computer network 200 having a client computer 202 and a server computer 204. In one embodiment, the client computer 202 and the server computer 204 run Windows NT™ operating system software and use one or more Intel Pentium™ processors to process instructions. It will be understood by those of ordinary skill in the art that the invention is not limited by an operating system or a type of processor. More particularly, the server computer 204 may be a NetFRAME ClusterServer 9000 (NF9000) series server computer provided by NetFRAME, Inc. of Milpitas, Calif.

In one embodiment, the client computer 202 and server computer 204 use a communication protocol 206 defined according to SNMP (Simple Network Management Protocol) to communicate with each other over a Windows NT-based network 200. The invention, however, is not limited by any particular network or network protocol. SNMP is well known in the art as a collection of standards and protocols for managing network-based devices. SNMP provides guidelines for requesting, obtaining and transporting management information between network components. (See, for example, Marshall T. Rose, *The Simple Book* (2d ed. 1994)). SNMP became an Internet Standard in 1990, when it was published as RFC1157 (Request For Comments No. 1157). Since then, the SNMP standards and protocols have been updated to support graphical user interfaces, and, so updated, the standards and protocols are referred to as WinSNMP. One embodiment of the present invention uses a WinSNMP product (including protocol stack and libraries) from ACE*COMM of Gaithersburg, Md., which implements WinSNMP in cooperation with Windows NT.

Management software called Maestro 208 runs on the client computer 202. Maestro 208 controls hot plug operations performed on the server computer 204. An SNMP agent 209 runs on the server computer 204. SNMP agents are known in the art. SNMP agents respond to SNMP requests (e.g., SNMP_GET, SNMP_GETNEXT, and SNMP_SET) received from management software, such as Maestro 208.

An SNMP extension agent 210 also runs on the server computer 204. The SNMP extension agent 210 also responds to SNMP requests (e.g., SNMP_GET, SNMP_GETNEXT, and SNMP_SET) received from Maestro 208, but only responds to requests not processed by the SNMP agent 209. Those of ordinary skill in the art will understand generally that SNMP agents may not process certain SNMP requests and, rather, may pass such requests to an SNMP extension agent.

In response to requests generated and sent by Maestro 208 over the network 200, the SNMP extension agent 210 assists in the performance of hot plug operations by acquiring hot plug variable information concerning components of the server computer 204, by sending the acquired hot plug variable information to Maestro 208, and by directing commands to any components of the server computer 204 involved in a hot plug operation as requested by Maestro 208.

The SNMP extension agent 210 communicates with a device driver called configuration manager 218 to acquire information about adapters or device drivers in the server computer 204 or to direct commands or requests to adapter-related components (e.g., device drivers servicing the adapters such as SCSI drivers or ethernet drivers). The SNMP extension agent 210 also communicates with a device driver called Intrapulse manager 220 to acquire information about I/O expansion slots, canisters (removable devices having multiple I/O expansion slots), power supplies and system boards of the server computer 204 or to direct commands or requests to related components such as associated drivers.

In another embodiment, both Maestro 208 and the SNMP extension agent 210 run on the server computer 204. In such an embodiment, a network administrator may invoke Maestro 208 as well as provide input to Maestro 208 from a client computer 202.

Maestro 208 maintains, in a computer readable medium such as random access memory (RAM), hot plug MIB (management information base) variable data 212 relating to characteristics, capabilities or states of components of the server computer 204 which may be involved in a hot plug operation. A MIB generally represents network, device, component and other information in a tree-like framework, specifying hierarchical relationships between the networks, devices, components and other elements.

A hot plug MIB defines a set of hot plug MIB variables and groups those hot plug variables according to the components that are managed during hot plug operations. MIBs are known in the art and are commonly used to define variables for use in managing network-based components or devices using SNMP standards and protocols. (See, for example, Dr. Sidnie Feit, *SNMP A Guide to Network Management* (1995); Mark A. Miller, *Managing Internetworks with SNMP* (1993)).

The SNMP extension agent also maintains, in a computer readable medium such as RAM, hot plug MIB variable data 214 relating to characteristics, capabilities or states of components of the server computer 204. While the set of hot plug MIB variables 212 maintained by Maestro may be the same as the set of hot plug MIB variables 214 maintained by the SNMP extension agent 210, the values of the variables may differ as those maintained on the server computer 204 may have been obtained more recently. In one embodiment, the hot plug MIB variable data 212 on the client computer 202 and the hot plug MIB variable data 214 on the server computer 204 are organized as tables in respective RAM.

Figure 3:
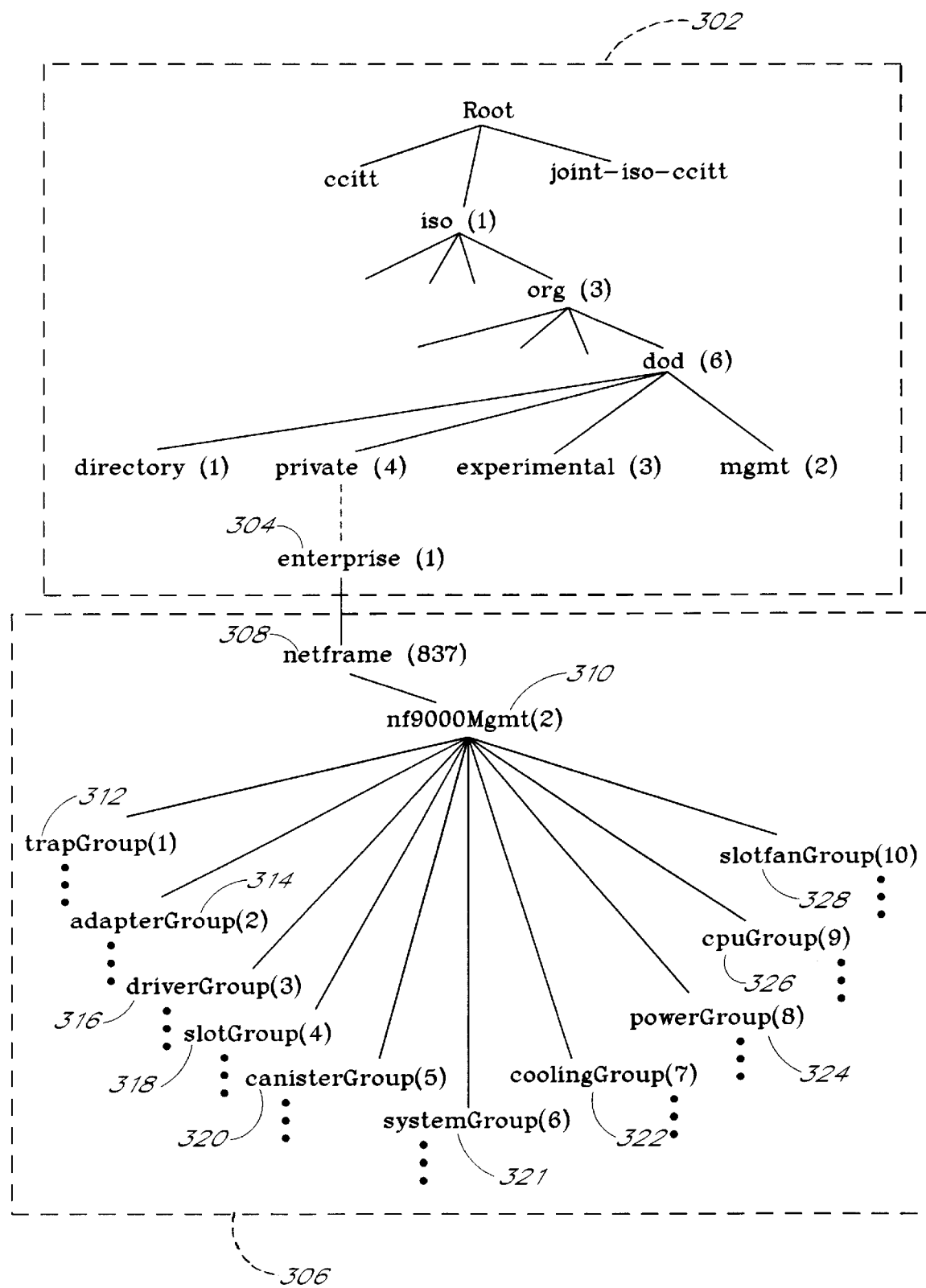
FIG. 3 illustrates a diagram representing the nodes of an extended MIB.

FIG. 3 represents portions of the hierarchical levels of a MIB. The nodes comprising upper levels of a MIB hierarchy 302 are fixed by the SNMP standard, including nodes corresponding to standards setting organizations down through industry-specific organizations down through particular networks and further down through private networks and to individual enterprises. Lower levels, and in particular levels below the "enterprise" node 304, are not defined by the SNMP and may be defined as needed. A portion of a MIB including the levels below the "enterprise" element 304 may be referred to as a subMIB 306.

According to the SNMP standard, the nodes comprising each hierarchical level of a MIB are assigned unique integer values in addition to names. Thus, a target node occupying a lower level in a MIB may be identified by listing in series separated by a "." the number assigned to each node encountered in a downward traversal of the MIB beginning with the highest (or root level) node. Thus, the "enterprise" node 304 may be identified as 1.3.6.4.1 (iso (1), org (3), dod (6), private (4), enterprise (1)).

The subMIB 306 extends the SNMP standard MIB, the extension defining groups of variables that support management operations performed on a server computer, in this case an NF9000 ClusterServer series server computer by NetFRAME, Inc. On the level immediately below the "enterprise" node 304, a "netframe" node 308 represents the highest level of the subMIB 306 extending the SNMP standard MIB. Nodes immediately below the "enterprise" node 304 may be requested from and registered by the Internet Assigned Numbers Authority (IANA) which assigns an integer value to a requested node and registers the name and assigned value.

In FIG. 3, the subMIB 306 defines a "nf9000Mgmt" node 310 at the level immediately below the "netframe" node 308. On the level immediately following the "nf9000Mgmt" node 310, the subMIB 306 defines group nodes corresponding to management related components of the server computer 204: a trapGroup node 312, an adapterGroup node 314, a driverGroup node 316, a slotGroup node 318, a canister-Group node 320, a systemGroup node 321, a coolingGroup node 322, a powerGroup node 324, a cpuGroup node 326, and a slotFanGroup node 328. Each group node includes MIB variables corresponding to a component of the server computer 204.

MIBs are formally described using an abstract syntax notation set out in ISO 8824. A MIB defining the nodes and group nodes of the subMIB 306 and also defining the MIB variables for each group node follows:

```
MIB DEFINITIONS     ::= BEGIN
    IMPORTS
        enterprises,
        Gauge,
        Counter,
        TimeTicks
            FROM RFC1155-SMI
        OBJECT-TYPE
            FROM RFC1212
        DisplayString
            FROM RFC1213-MIB;

--
    -- Object Identifiers
    --
    netframe        OBJECT IDENTIFIER ::= {enterprises 837}
    nf9000Mgmt      OBJECT IDENTIFIER ::= {netframe 2} trapGroup       OBJECT IDENTIFIER ::= {nf9000Mgmt 1}
    adapterGroup    OBJECT IDENTIFIER ::= {nf9000Mgmt 2}
    driverGroup     OBJECT IDENTIFIER ::= {nf9000Mgmt 3}
    slotGroup       OBJECT IDENTIFIER ::= {nf9000Mgmt 4}
    canisterGroup   OBJECT IDENTIFIER ::= {nf9000Mgmt 5}
    systemGroup     OBJECT IDENTIFIER ::= {nf9000Mgmt 6}
    coolingGroup    OBJECT IDENTIFIER ::= {nf9000Mgmt 7}
    powerGroup      OBJECT IDENTIFIER ::= {nf9000Mgmt 8}
    cpuGroup        OBJECT IDENTIFIER ::= {nf9000Mgmt 9}
    slotFanGroup    OBJECT IDENTIFIER ::= {nf9000Mgmt 10}

--
    -- THE TRAP GROUP defines traps.
    --
    trapCpu TRAP-TYPE
        ENTERPRISE trapGroup
        VARIABLES {
            cpuNumber
        }
        DESCRIPTION
            "Indicates that the CPU identified by cpuNumber failed because of
            high temperature and/or low power."
        ::= 1
```

```
trapSystemBoardFan TRAP-TYPE
    ENTERPRISE trapGroup
    VARIABLES {
            coolingFanNumber
    }
    DESCRIPTION
            "Indicates that the speed of the system board fan identified by
            coolingFanNumber dropped below the minimum limit (see
            coolingFanMinSpeed)."
    ::= 2 trapTemperature TRAP-TYPE
    ENTERPRISE trapGroup
    VARIABLES {
            coolingSensorNumber
    }
    DESCRIPTION
            "Indicates that the temperature sensor identified by cooling
            SensorNumber reported a 'normal' to 'warning' transition (i.e.,
            temperature raised above the warning level).
            "
    ::= 3
trapPowerSupply TRAP-TYPE
    ENTERPRISE trapGroup
    VARIABLES {
            powerSupplyNumber
    }
    DESCRIPTION
            "Indicates one of the following conditions:
            1.  The power supply identified by powerSupplyNumber has been
                extracted (NF9000-C only).
            2.  The power supply identified by powerSupplyNumber has been
                inserted (NF9000-C only).  Check powerSupplyDcState and
                powerSupplyAcState (if applicable) for abnormal conditions.
            3.  The AC state of the power supply identified by
                powerSupplyNumber is out of tolerance range (NF9000-C only).
            4.  The DC state of the power supply identified by
                powerSupplyNumber is out of tolerance range.
            5.  The DC state of the power supply identified by
                powerSupplyNumber is reported as out of tolerance range
                because the power supply is not present (NF9000-T only).
            "
    ::= 4
```

```
trapCanister TRAP-TYPE
    ENTERPRISE trapGroup
    VARIABLES {
            canisterNumber
    }
    DESCRIPTION
        "Indicates that the canister identified by canisterNumber has been
        either extracted or inserted."
    ::= 3 trapAdapter TRAP-TYPE
    ENTERPRISE trapGroup
    VARIABLES {
            adapterNumber
    }
    DESCRIPTION
        "Indicates that the adapter identified by adapterNumber or its driver
        is malfunctioning."
    ::= 6 trapSlotFan TRAP-TYPE
    ENTERPRISE trapGroup
    VARIABLES {
            slotFanNumber
    }
    DESCRIPTION
        "Indicates that the speed of the I/O slot fan identified by
        slotFanNumber dropped below the minimum limit
        (slotFanMinSpeed)."
    ::= 7 trapCanisterFan TRAP-TYPE
    ENTERPRISE trapGroup
    VARIABLES {
            canisterName
    }

DESCRIPTION
        "Indicates that the speed of a fan in the canister identified by
        canisterName has dropped below the minimum limit (see
        canisterFanMinSpeed).
        "
    ::= 8
```

```
     --
     --   THE ADAPTOR GROUP of objects provides information on the adapters
     --   in the system.
     --
 5   adapterTable OBJECT-TYPE
             SYNTAX SEQUENCE OF AdapterTableEntry
             ACCESS not-accessible
             STATUS mandatory
             DESCRIPTION
10               "This table contains the description of all the adapters in the system."
             ::={adapterGroup 1} adapterTableEntry OBJECT-TYPE
             SYNTAX AdapterTableEntry
15           ACCESS not-accessible
             STATUS mandatory
             DESCRIPTION
                 "This entry contains the description of a hot-swappable adapter."
             INDEX {adapterNumber}
20   ::={adapterTable 1}

AdapterTableEntry ::= SEQUENCE {
                             adapterNumber INTEGER,
                             adapterName DisplayString,
25                           adapterSupportHotSwapHotAdd INTEGER,
                             adapterState INTEGER,
                             adapterCommand INTEGER,
                             adapterDriverNumber INTEGER,
                             adapterBusNumber INTEGER,
30                           adapterDeviceNumber INTEGER,
                             adapterFunctionNumber INTEGER,
                             adapterVendorID INTEGER,
                             adapterDeviceID INTEGER,
                             adapterRevisionID INTEGER,
35                           adapterBaseClass INTEGER,
                             adapterSubClass INTEGER,
                             adapterProgrammingInterface INTEGER
                         }

40   adapterNumber OBJECT-TYPE
             SYNTAX INTEGER (1..100000)
             ACCESS read-only
             STATUS mandatory
             DESCRIPTION
45               "Indicates the number of this adapter."
             ::= {adapterTableEntry 1}
```

-20-

```
            adapterName OBJECT-TYPE
                SYNTAX DisplayString (size(0..255))
                ACCESS read-only
                STATUS mandatory
 5              DESCRIPTION
                    "Indicates the unique name of this adapter. On Windows NT, it
                    is available only for hot-swappable adapters."
                ::= {adapterTableEntry 2}

10          adapterSupportsHotSwapHotAdd  OBJECT-TYPE
                SYNTAX INTEGER {
                        Yes(1),
                        No(2)
                }
15              ACCESS read-only
                STATUS mandatory
                DESCRIPTION
                    "Indicates whether this adapter supports hot swap/hot add.
                    "
20              ::= {adapterTableEntry 3} adapterState OBJECT-TYPE
                SYNTAX INTEGER   {
                        Unclaimed(1),
25                      Unknown(2),
                        Failed(3),
                        Active(4),
                        Suspended(5)
                }
30              ACCESS read-only
                STATUS mandatory
                DESCRIPTION
                    "Indicates the current state of this adapter and/or its driver.

35                  State       Meaning

Unclaimed   No driver is loaded for this adapter,

Unknown     Two cases are possible:
40                          1)  The adapter supports hot swap, and is not
                                responding to commands.
                            2)  The adapter does not support hot swap. Its actual
                                state cannot be determined.

45                  Failed      The driver or adapter is malfunctioning.
```

-21-

Active   The adapter and its driver are working normally.

Suspended   The operations on the adapter have been suspended by a SuspendOperations or ForceSuspendOperations command."
::= {adapterTableEntry 4} adapterCommand OBJECT-TYPE
    SYNTAX INTEGER   {
            Reset(3),
            SuspendOperations(4),
            ForceSuspendOperations(5)
            ResumeOperations(6)
    }
    ACCESS write-only
    STATUS mandatory
    DESCRIPTION
        "Indicates a command to be sent to the adapter. In most cases, it is used for hot-swapping or hot-adding a card.

| State | Meaning |
|---|---|
| Reset | Causes the adapter to re-initialize and resume operations. |
| SuspendOperations | Suspends all operations on this adapter in preparation for card swapping. |
| ForceSuspendOperations | Forcefully suspends all operations on this adapter in preparation for card swap/add. Must be used on the NF9000-C when the canister containing the adapter to swap (or receiving the adapter to add) contains also adapters that do not support hot swap. On the NF9000-T it is identical to SuspendOperations. |
| ResumeOperations | Resumes the operations on this adapter. Implies the re-initialization of the card. |

::= {adapterTableEntry 5}

```
adapterDriverNumber OBJECT-TYPE
    SYNTAX INTEGER
    ACCESS read-only
    STATUS mandatory
    DESCRIPTION
        "Indicates the number of the driver handling this adapter. Can be
        used to index the driverTable."
    ::= {adapterTableEntry 6} adapterBusNumber OBJECT-TYPE
    SYNTAX INTEGER (0..255)
    ACCESS read-only
    STATUS mandatory
    DESCRIPTION
        "Indicates the bus number of this adapter."
    ::= {adapterTableEntry 7} adapterDeviceNumber OBJECT-TYPE
    SYNTAX INTEGER (0..31)
    ACCESS read-only
    STATUS mandatory
    DESCRIPTION
        "Indicates the device number of this adapter."
    ::= {adapterTableEntry 8} adapterFunctionNumber OBJECT-TYPE
    SYNTAX INTEGER (0..7)
    ACCESS read-only
    STATUS mandatory
    DESCRIPTION
        "Indicates the Function number of this adapter."
    ::= {adapterTableEntry 9} adapterVendorID OBJECT-TYPE
    SYNTAX INTEGER (0..65535)
    ACCESS read-only
    STATUS mandatory
    DESCRIPTION
        "Indicates the VendorID for this adapter."
    ::= {adapterTableEntry 10} adapterDeviceID OBJECT-TYPE
    SYNTAX INTEGER (0..65535)
    ACCESS read-only
    STATUS mandatory
    DESCRIPTION
```

```
                "Indicates the DeviceID code for this adapter."
            ::= {adapterTableEntry 11} adapterRevisionID OBJECT-TYPE
            SYNTAX INTEGER (O..65535)
            ACCESS read-only
            STATUS mandatory
            DESCRIPTION
                "Indicates the RevisionID code for this adapter."
            ::= {adapterTableEntry 12} adapterBaseClass OBJECT-TYPE
            SYNTAX INTEGER (O..255)
            ACCESS read-only
            STATUS mandatory
            DESCRIPTION
                "Indicates the Base Class code for this adapter."
            ::= {adapterTableEntry 13} adapterSubClass OBJECT-TYPE
            SYNTAX INTEGER (O..255)
            ACCESS read-only
            STATUS mandatory
            DESCRIPTION
                "Indicates the Sub Class code for this adapter."
            ::= {adapterTableEntry 14} adapterProgrammingInterface OBJECT-TYPE
            SYNTAX INTEGER (O..255)
            ACCESS read-only
            STATUS mandatory
            DESCRIPTION
                "Indicates the Programming Interface code for this adapter."
            ::= {adapterTableEntry 15}

--
    -- THE DRIVER GROUP of objects provides information on the drivers in
       the
    -- system.
    -- driverTable OBJECT-TYPE
        SYNTAX SEQUENCE of DriverTableEntry
        ACCESS not-accessible
        STATUS mandatory
        DESCRIPTION
```

-24-

```
                    "This table contains information on drivers for hot-swappable
                    adapters."
             ::= {driverGroup 1} driverTableEntry OBJECT-TYPE
             SYNTAX INTEGER {1..100000)
             ACCESS not-accessible
             STATUS mandatory
             DESCRIPTION
                    "This entry contains the description of a driver."
             INDEX {driverNumber}
        ::= {driverTable 1}

DriverTableEntry ::= SEQUENCE {
                                   driverNumber INTEGER,
                                   driverName DisplayString,
                                   driverVersion DisplayString,
        } driverNumber OBJECT-TYPE
             SYNTAX INTEGER (1..100000)
             ACCESS read-only
             STATUS mandatory
             DESCRIPTION
                    "Indicates the number of this driver."
        ::= {driverTableEntry 1} driverName OBJECT-TYPE
             SYNTAX DisplayString (SIZE(0..255))
             ACCESS read-only
             STATUS mandatory
             DESCRIPTION
                    "Indicates the unique name of this driver."
        ::= {driverTableEntry 2} driverVersion OBJECT-TYPE
             SYNTAX DisplayString (SIZE(0..255))
             ACCESS read-only
             STATUS mandatory
             DESCRIPTION
                    "Indicates the version of this driver.  It may not be available
                    for some drivers."
        ::= {driverTableEntry 3}
```

```
--
--   THE SLOT GROUP of objects provides information on the I/O expansion
--   slots.
--
slotTable OBJECT-TYPE
        SYNTAX SEQUENCE of SlotTableEntry
        ACCESS not-accessible
        STATUS mandatory
        DESCRIPTION
                "This table describes the I/O expansion slots in the system.  It is
                indexed by (slotgroup#, slot#) pairs."
        ::= {slotGroup 1} slotTableEntry OBJECT-TYPE
        SYNTAX SlotTableEntry
        ACCESS not-accessible
        STATUS mandatory
        DESCRIPTION
                "This entry describes a I/O expansion slot. A slot is identified by
                the pair (slotgroup#, slot#).
                INDEX {slotGroupNumber, slotNumber}
        ::= {slotTable 1}

SlotTableEntry ::= SEQUENCE {
                                slotGroupNumber INTEGER,
                                slotNumber INTEGER,
                                slotBusNumber INTEGER,
                                slotDeviceNumber INTEGER,
                                slotAdapterPresence INTEGER,
                                slotLocation DisplayString,
        } slotGroupNumber OBJECT-TYPE
        SYNTAX INTEGER (1..4)
        ACCESS read-only
        STATUS mandatory
        DESCRIPTION
                "Indicates the number of the slot group this slot belongs to.
                On the NF9000-C, slotGroupNumber coincides with the
                canisterNumber and can be used as an index into the
                Canister Table."
        ::= {slotTableEntry 1}
```

```
slotNumber OBJECT-TYPE
    SYNTAX INTEGER (1..8)
    ACCESS read-only
    STATUS mandatory
    DESCRIPTION
        "Indicates the unique logical number of an I/O expansion
        slot in the group identified by slotGroupNumber.  It has no
        relationship with the device number."
    ::= {slotTableEntry 2} slotBusNumber OBJECT-TYPE
    SYNTAX INTEGER (0..255)
    ACCESS read-only
    STATUS mandatory
    DESCRIPTION
        "Indicates an I/O expansion bus.  This number coincides
        with the corresponding physical bus number."
    ::= {slotTableEntry 3} slotDeviceNumber OBJECT-TYPE
    SYNTAX INTEGER (0..31)
    ACCESS read-only
    STATUS mandatory
    DESCRIPTION
        "Indicates a physical device number on the bus identified by
        slotBusNumber."
    ::= {slotTableEntry 4} slotAdapterPresence OBJECT-TYPE
    SYNTAX INTEGER  {
                    Present(1),
                    Absent(2)
                    }
    ACCESS read-only
    STATUS mandatory
    DESCRIPTION
        "Indicates whether a card is present in this slot."
    ::= {slotTableEntry 5} slotPowerState OBJECT-TYPE
    SYNTAX INTEGER  {
                    On(1),
                    Off(2),
                    Unavailable(3)
                    }
    ACCESS read-write
```

-27-

```
              STATUS mandatory
              DESCRIPTION
                  "Indicates the PCI slot power state."
          ::= {slotTableEntry 6} slotLocation OBJECT-TYPE
              SYNTAX DisplayString (SIZE(0.255))
              ACCESS read-only
              STATUS mandatory
              DESCRIPTION
                  "Indicates the location of an I/O expansion slot as follows:

NF9000-T:
```

| slotGroupNumber | slotNumber | slotLocation |
|---|---|---|
| 1 | 1 | 'First slot from the left, front view' |
| 1 | 2 | 'Second slot from the left, front view' |
| 1 | 3 | 'Third slot from the left, front view' |
| 1 | 4 | 'Fourth slot from the left, front view' |
| 1 | 5 | 'Fifth slot from the left, front view' |
| 1 | 6 | 'Sixth slot from the left, front view' |
| 1 | 7 | 'Seventh slot from the left, front view' |
| 1 | 8 | 'Eighth slot from the left, front view' |

NF9000-C

| slotGroupNumber | slotNumber | slotLocation |
|---|---|---|
| 1 or 3 | 1 | 'First slot from the top' |
| 1 or 3 | 2 | 'Second slot from the top' |
| 1 or 3 | 3 | 'Third slot from the top' |
| 1 or 3 | 4 | 'Fourth slot from the top' |
| 2 or 4 | 1 | 'First slot from the bottom' |
| 2 or 4 | 2 | 'Second slot from the bottom' |
| 2 or 4 | 3 | 'Third slot from the bottom' |

|  | 2 or 4 | 4 | 'Fourth slot from the bottom' |

```
                        "
                ::= {slotTableEntry 7}

--
        --      THE CANISTER GROUP of objects provides information on the canisters.
        -- canisterMaximumNumberOfCanisters  OBJECT-TYPE
                SYNTAX INTEGER (0..4)
                ACCESS read-only
                STATUS mandatory
                DESCRIPTION
                        "Indicates the maximum number of canisters supported by this
                        system."
                ::= {canisterGroup 1} canisterTable OBJECT-TYPE
                SYNTAX SEQUENCE OF CanisterTableEntry
                ACCESS not-accessible
                STATUS mandatory
                DESCRIPTION
                        "This table describes the attributes of all the canisters in the
                        system."
                ::= {canisterGroup 2} canisterTableEntry OBJECT-TYPE
                SYNTAX CanisterTableEntry
                ACCESS not-accessible
                STATUS mandatory
                DESCRIPTION
                        "Describes the attributes of a canister."
                INDEX {canisterNumber}
                ::= {canisterTable 1}

CanisterTableEntry ::= SEQUENCE {
                                        canisterNumber INTEGER,
                                        canisterName DisplayString,
                                        canisterSerialNumber DisplayString,
                                        canisterRevisionInfo DisplayString,
                                        canisterDescription DisplayString,
                                        canisterPowerState INTEGER,
                                        canisterLocation DisplayString,
                                        canisterFanMinSpeed INTEGER,
                                        canisterFanSpeedSetting INTEGER,
```

-29-

```
                                    canisterFan1Speed Gauge,
                                    canisterFan1Fault INTEGER,
                                    canisterFan2Speed, Gauge,
                                    canisterFan2Fault INTEGER
 5              } canisterNumber OBJECT-TYPE
                    SYNTAX INTEGER (1..4)
                    ACCESS read-only
10                  STATUS mandatory
                    DESCRIPTION
                        "This canister number."
                    ::= {canisterTableEntry 1}

15              canisterNumber OBJECT-TYPE
                    SYNTAX DisplayString (SIZE(1))
                    ACCESS read-only
                    STATUS mandatory
                    DESCRIPTION
20                      "This canister name.  Can be A, B, C or D."
                    ::= {canisterTableEntry 2}
                canisterSerialNumber OBJECT-TYPE
                    SYNTAX DisplayString (SIZE(0..255))
                    ACCESS read-only
25                  STATUS mandatory
                    DESCRIPTION
                        "Indicates this canister's serial number."
                    ::= {canisterTableEntry 3}

30              canisterRevisionInfo OBJECT-TYPE
                    SYNTAX DisplayString 9SIZE(0..255))
                    ACCESS read-only
                    STATUS mandatory
                    DESCRIPTION
35                      "Indicates the revision number and date of this canister's controller."
                    ::= {canisterTableEntry 4} canisterDescription OBJECT-TYPE
                    SYNTAX DisplayString (SIZE(0..255))
40                  ACCESS read-only
                    STATUS mandatory
                    DESCRIPTION
                        "Describes this canister."
                    ::= {canisterTableEntry 5}
45
```

```
canisterPowerState OBJECT-TYPE
    SYNTAX INTEGER {
                On(1),
                Off(2)
    }
    ACCESS read-write
    STATUS mandatory
    DESCRIPTION
        "Indicates the state of this canister's power. This state can be changed
        to drive card or canister hot-swapping, and card hot-adding."
    ::= {canisterTableEntry 6} canisterLocation OBJECT-TYPE
    SYNTAX DisplayString (SIZE(0..255))
    ACCESS read-only
    STATUS mandatory
    DESCRIPTION
        "Describes the location of this canister.  The canister locations are as
        follows:

canisterName     canisterLocation
            A            'Top left'
            B            'Top right'
            C            'Bottom left'
            D            'Bottom right'
        "
    ::= {canisterTableEntry 7} canisterFanMinSpeed OBJECT-TYPE
    SYNTAX INTEGER (0..255)
    ACCESS read-write
    STATUS mandatory
    DESCRIPTION
        "Indicates the minimum fan speed (in RPS-Revolutions Per Second)
        that causes a fault.  It applies to both fans."
    ::= {canisterTableEntry 8} canisterFanSpeedSetting OBJECT-TYPE
    SYNTAX INTEGER {
                Low(1),
                High(2)
    }
    ACCESS read-write
    STATUS mandatory
    DESCRIPTION
```

-31-

"Indicates the current fan speed setting. Normally it is low. If high, it means that the speed of one or both fans dropped below the low limit."
::= {canisterTableEntry 9} canisterFan1Speed OBJECT-TYPE
    SYNTAX Gauge
    ACCESS read-only
    STATUS mandatory
    DESCRIPTION
        "Measured fan #1 speed in RPS (Revolutions Per Second)."
    ::= {canisterTableEntry 10} canisterFan1Fault OBJECT-TYPE
    SYNTAX INTEGER {
                Yes(1),
                No(2)
    }
    ACCESS read-only
    STATUS mandatory
    DESCRIPTION
        "Indicates the current state of fan #1."
    ::= {canisterTableEntry 11} canisterFan2Speed OBJECT-TYPE
    SYNTAX Gauge
    ACCESS read-only
    STATUS mandatory
    DESCRIPTION
        "Measured fan #2 speed in RPS (Revolutions Per Second)."
    ::= {canisterTableEntry 12} canisterFan2Fault OBJECT-TYPE
    SYNTAX INTEGER {
                Yes(1),
                No(2)
    }
    ACCESS read-only
    STATUS mandatory
    DESCRIPTION
        "Indicates the current state of fan #2."
    ::= {canisterTableEntry 13}

```
--
--   The System Group of objects provides general information on the system.
--
systemModel OBJECT-TYPE
    SYNTAX INTEGER {
                NF9000C(1),
                NF9000T(2)
    }
    ACCESS read-only
    STATUS mandatory
    DESCRIPTION
        "Indicates the current NetFRAME product. NF9000C is the Canister
        version, NF9000t is the Tower version."
    ::= { systemGroup 1 } systemBoardSerialNumber OBJECT-TYPE
    SYNTAX DisplayString (SIZE(0..255))
    ACCESS read-only
    STATUS mandatory
    DESCRIPTION
        "The serial number of the system board."
    ::= { systemGroup 2 } systemBackPlaneSerialNumber OBJECT-TYPE
    SYNTAX DisplayString (SIZE(0..255))
    ACCESS read-only
    STATUS mandatory
    DESCRIPTION
        "The serial number of the system board."
    ::= { systemGroup 2} systemBackPlaneSerialNumber OBJECT-TYPE
    SYNTAX DisplayString (SIZE(0..255))
    ACCESS read-only
    STATUS mandatory
    DESCRIPTION
        "The serial number of the system back plane."
    ::= { systemGroup 3 } systemBackPlaneControllerRevisionInfo OBJECT-TYPE
    SYNTAX DisplayString (SIZE(0..255))
    ACCESS read-only
    STATUS mandatory
    DESCRIPTION
        "The revision number and date of the system back plane controller."
    ::= { systemGroup 4 }
```

-33-

```
        systemBackPlaneControllerDescription  OBJECT-TYPE
            SYNTAX  DisplayString (SIZE(0..255))
            ACCESS  read-only
            STATUS  mandatory
 5          DESCRIPTION
                "Describes the system back plane controller."
            ::= { systemGroup 5 } systemControllerRevisionInfo  OBJECT-TYPE
10          SYNTAX  DisplayString (SIZE(0..255))
            ACCESS  read-only
            STATUS  mandatory
            DESCRIPTION
                "The revision number and date of Wire Service's Controller A, which
15              controls the DIMM detection, the system reset, the system board fans,
                and the LCD."
            ::= { systemGroup 6 } systemControllerADescription  OBJECT-TYPE
20          SYNTAX  DisplayString (SIZE(0..255))
            ACCESS  read-only
            STATUS  mandatory
            DESCRIPTION
                "Describes the Wire Service's Controller A, which controls the DIMM
25              detection, the system reset the system board fans, and the LCD."
            ::= { systemGroup 7 } systemControllerBRevisionInfo  OBJECT-TYPE
            SYNTAX  DisplayString (SIZE(0..255))
30          ACCESS  read-only
            STATUS  mandatory
            DESCRIPTION
                "The revision number and date of Wire Service's Controller B, which
                controls the H/W interface between Wire Service and the Operating
35              System."
            ::= { systemGroup 8 } systemControllerBDescription  OBJECT-TYPE
            SYNTAX  DisplayString (SIZE(0..255))
40          ACCESS  read-only
            STATUS  mandatory
            DESCRIPTION
                "Describes Wire Service's Controller B, which controls the H/W
                interface between Wire Service and the Operating System."
45          ::= { systemGroup 9 }
```

```
            systemLogControllerRevisionInfo  OBJECT-TYPE
                SYNTAX DisplayString (SIZE(0..255))
                ACCESS read-only
                STATUS mandatory
 5              DESCRIPTION
                    "The revision number and date of the Wire Service's System Log
                    Controller."
                ::= { systemGroup 10 }

10          systemLogControllerDescription  OBJECT-TYPE
                SYNTAX DisplayString (SIZE(0..255))
                ACCESS read-only
                STATUS mandatory
                DESCRIPTION
15                  "Describes the Wire Service's System Log Controller."
                ::= { systemGroup 11 } systemLocalInterfaceControllerRevisionInfo  OBJECT-TYPE
                SYNTAX DisplayString (SIZE(0..255))
20              ACCESS read-only
                STATUS mandatory
                DESCRIPTION
                    "The revision number and date of the Wire Service's Local Interface
                    Controller."
25              ::= { systemGroup 12 } systemLocalInterfaceControllerDescription  OBJECT-TYPE
                SYNTAX DisplayString (SIZE(0..255))
                ACCESS read-only
30              STATUS mandatory
                DESCRIPTION
                    "Describes the Wire Service's Local Interface Controller."
                ::= { systemGroup 13 }

35          systemRemoteInterfaceControllerRevisionInfo  OBJECT-TYPE
                SYNTAX DisplayString (SIZE(0..255))
                ACCESS read-only
                STATUS mandatory
                DESCRIPTION
40                  "The revision number and date of the Wire Service's Remote Interface
                    Controller."
                ::= { systemGroup 14 } systemRemoteInterfaceControllerDescription  OBJECT-TYPE
45              SYNTAX DisplayString (SIZE(0..255))
                ACCESS read-only
```

-35-

```
        STATUS  mandatory
        DESCRIPTION
            "Describes the Wire Service's Remote Interface Controller."
        ::= { systemGroup 15 } systemState OBJECT-TYPE
    SYNTAX INTEGER {
        OK(1),
        Faulted(2)
    }
    ACCESS read-only
    STATUS  mandatory
    DESCRIPTION
        "Indicates the general system state.  If any fault is detected in the
        system, it reports 'Faulted.'  Note that this does not necessarily mean
        a fatal fault."
    ::= { systemGroup 16 } systemDateAndTime OBJECT-TYPE
    --
    -- The syntax "...SIZE(8..11)" may be used instead of the
    -- correct "...SIZE(8|11)" to support certain MIB compilers.
    -- The octet string size is either 8 or 11.
    --

SYNTAX OCTET STRING (SIZE(8..11))
    ACCESS read-only
    STATUS  mandatory
    DESCRIPTION
        "Indicates the date and time on this system.
```

| Field | Octets | Contents | Range |
|---|---|---|---|
| 1 | 1-2 | year | 0..2100 |
| 2 | 3 | month | 1..12 |
| 3 | 4 | day | 1..31 |
| 4 | 5 | hour | 0..23 |
| 5 | 6 | minutes | 0..59 |
| 6 | 7 | seconds | 0..60 |
|   |   | (use 60 for leap-second) |   |
| 7 | 8 | deci-seconds | 0..9 |
| 8 | 9 | direction from UTC | '+' / '-' |
| 9 | 10 | hours from UTC | 0..11 |
| 10 | 11 | minutes from UTC | 0..59 |

-36-

```
                    Note that if only local time is known, then timezone information
                    (fields 8-10) is not present."
            ::= { systemGroup 17 }

5      systemMemorySize OBJECT-TYPE
            SYNTAX INTEGER
            ACCESS read-only
            STATUS mandatory
            DESCRIPTION
10              "Indicates the total main memory size."
            ::= { systemGroup 18 } systemDimmTable OBJECT-TYPE
            SYNTAX SEQUENCE OF SystemDimmTableEntry
15          ACCESS not-accessible
            STATUS mandatory
            DESCRIPTION
                "Describes the type of DIMMs (Dual In-Line Memory Module) in the
                system."
20          ::= { systemGroup 19 } systemDimmTableEntry OBJECT-TYPE
            SYNTAX SystemDimmTableEntry
            ACCESS not-accessible
25          STATUS mandatory
            DESCRIPTION
                "Describes a DIMM."
            ::= { systemDimmTable 1 }

30      SystemDimmTableEntry ::= SEQUENCE {
                                    systemDimmNumber INTEGER,
                                    systemDimmCapacity INTEGER,
                                    systemDimmSpeed INTEGER,
                                    systemDimmDataAccessMode INTEGER
35          } systemDimmNumber OBJECT-TYPE
            SYNTAX INTEGER (1..16)
            ACCESS read-only
40          STATUS mandatory
            DESCRIPTION
                "Indicates the logical number of this DIMM."
            ::= { systemDimmTableEntry 1 }

45
```

-37-

```
        systemDimmCapacity OBJECT-TYPE
            SYNTAX INTEGER
            ACCESS read-only
            STATUS mandatory
            DESCRIPTION
                "Indicates the DIMM capacity in megabytes."
            ::= { systemDimmTableEntry 2 } systemDimmSpeed OBJECT-TYPE
            SYNTAX INTEGER (0..70)
            ACCESS read-only
            STATUS mandatory
            DESCRIPTION
                "Indicates the DIMM speed in nanoseconds."
            ::= { systemDimmTableEntry 3 } systemDimmDataAccessMode OBJECT-TYPE
            SYNTAX INTEGER {
                        FastPage(1),
                        FastPageWithEDO(2)
            }
            ACCESS read-only
            STATUS mandatory
            DESCRIPTION
                "Indicates the DIMM data access mode."
            ::= { systemDimmTableEntry 4 } systemOsName OBJECT-TYPE
        SYNTAX INTEGER {
                    WindowsNT(1),
                    Netware(2)
        }
        ACCESS read-only
        STATUS mandatory
        DESCRIPTION
            "Indicates the name of the server operating system."
        ::= { systemGroup 20 } systemLicense OBJECT-TYPE
        SYNTAX OCTET STRING (SIZE(1))
        ACCESS read-only
        STATUS mandatory
        DESCRIPTION
            "Indicates the type of liense currently active.
```

```
                Octet No.           Value    Meaning
                    1                 0      Hot swap and hot add are not supported
                    1                 1      Hot swap and hot add are supported."
        ::= { systemGroup 21 }

--
--   THE COOLING GROUP provides information on system board fans and
--   temperature sensors.
-- coolingFansGeneralFaulted OBJECT-TYPE
        SYNTAX INTEGER {
                        On(1),
                        Off(2)
        }
        ACCESS read-only
        STATUS mandatory
        DESCRIPTION
                "Indicates whether any one system board fan has failed."
        ::= { coolingGroup 1 } coolingFanMinSpeed OBJECT-TYPE
        SYNTAX INTEGER (0..255)
        ACCESS read-write
        STATUS mandatory
        DESCRIPTION
                "Indicates the minimum fan speed (in RPS-Revolutions Per Second)
                that causes a fault."
        ::= { coolingGroup 2 } coolingFanSpeedSetting OBJECT-TYPE
        SYNTAX INTEGER {
                        Low(1),
                        High(2)
        }
        ACCESS read-write
        STATUS mandatory
        DESCRIPTION
                "Indicates the current fan speed setting. Normally it is low. If High,
                it means that the speed of one or more fans dropped below the low
                limit."
        ::= { coolingGroup 3 } coolingMaximumNumberOfSystemFans OBJECT-TYPE
        SYNTAX INTEGER (1..6)
        ACCESS read-only
```

```
                STATUS mandatory
                DESCRIPTION
                    "Indicates the maximum  number of system fans in this product."
                ::= { coolingGroup 4 }
 5
        coolingFanTable OBJECT-TYPE
                SYNTAX SEQUENCE OF CoolingFanTableEntry
                ACCESS not-accessible
                STATUS mandatory
10              DESCRIPTION
                    "Describes the programmable fans on the system board."
                ::= { coolingGroup 5 } coolingFanTableEntry OBJECT-TYPE
15              SYNTAX CoolingFanTableEntry
                ACCESS not-accessible
                STATUS mandatory
                DESCRIPTION
                    "Describes a programmable fan."
20              INDEX { coolingFanNumber }
                ::= { coolingFanTable 1 }

CoolingFanTableEntry ::= SEQUENCE {
                                                coolingFanNumber INTEGER,
25                                              coolingFanSpeed Gauge,
                                                coolingFanFault INTEGER,
                                                coolingFanLocation DisplayString
                }

30      coolingFanNumber OBJECT-TYPE
                SYNTAX INTEGER (1..6)
                ACCESS read-only
                STATUS mandatory
                DESCRIPTION
35                  "Unique logical fan number within this system."
                ::= { coolingFanTableEntry 1 } coolingFanSpeed OBJECT-TYPE
                SYNTAX Gauge
40              ACCESS read-only
                STATUS mandatory
                DESCRIPTION
                    "Measured fan speed in RPS (Revolutions Per Second)."
                ::= { coolingFanTableEntry 2 }
45
```

-40-

```
coolingFanFault OBJECT-TYPE
    SYNTAX INTEGER {
                Yes(1),
                No(2)
    }
    ACCESS read-only
    STATUS mandatory
    DESCRIPTION
        "Indicates the current state of this fan."
    ::= { coolingFanTableEntry 3 } coolingFanLocation OBJECT-TYPE
    SYNTAX DisplayString (SIZE(0..255))
    ACCESS read-only
    STATUS mandatory
    DESCRIPTION
        "Indicates where this fan is located to allow the user to physically
        reach it in case of malfunction."

The fan locations for the NF9000-C are as follows:
```

| coolingFanNumber | coolingFanLocation |
|---|---|
| 1 | 'First from the right, rear view' |
| 2 | 'second from the right, rear view' |
| 3 | 'Third from the right, rear view' |
| 4 | 'Fourth from the right, rear view' |
| 5 | 'Fifth from the right, rear view' |
| 6 | 'Sixth from the right, rear view' |

The fan locations for the NF9000-T are as follows:

| coolingFanNumber | coolingFanLocation |
|---|---|
| 1 | 'First from the top, front view' |
| 2 | 'Second from the top, front view' |
| 3 | 'Third from the top, front view' |
| 4 | 'Fourth from the top, front view' |
| 5 | 'First from the top, rear view' |
| 6 | 'Second from the top, rear view' |

```
    "
    ::= { coolingFanTableEntry 4 } coolingAlertTemperature OBJECT-TYPE
    SYNTAX INTEGER (0..255)
    ACCESS read-write
    STATUS mandatory
    DESCRIPTION
```

```
                    "Indicates at which temperature Celsius the system should generate an
                    alert. Note that the alert is generated if any sensor detects this
                    temperature or higher, regardless of its location."
               ::= { coolingGroup 6 }
 5
          coolingShutdownTemperature  OBJECT-TYPE
               SYNTAX  INTEGER (0..255)
               ACCESS  read-write
               STATUS  mandatory
10             DESCRIPTION
                    "Indicates at which temperature Celsius the Wire Service should shut
                    the system down. Note that the shutdown is performed if any sensor
                    detects this temperature, regardless of its location."
               ::= { coolingGroup 7 }
15
          coolingMaximumNumberOfTemperatureSensors  OBJECT-TYPE
               SYNTAX  INTEGER (1..5)
               ACCESS  read-only
               STATUS  mandatory
20             DESCRIPTION
                    "Indicates the maximum number of system temperature sensors in this
                    product."
               ::= { coolingGroup 8 }

25        coolingTemperatureSensorTable  OBJECT-TYPE
               SYNTAX  SEQUENCE OF CoolingTemperatureSensorTableEntry
               ACCESS  not-accessible
               STATUS  mandatory
               DESCRIPTION
30                  "Describes the state of the temperature sensors in the system."
               ::= { coolingGroup 9 } coolingTemperatureSensorTableEntry  OBJECT-TYPE
               SYNTAX  CoolingTemperatureSensorTableEntry
35             ACCESS  not-accessible
               STATUS  mandatory
               DESCRIPTION
                    "Describes the state of a temperature sensor."
               INDEX { coolingSensorNumber }
40             ::= { coolingTemperatureSensorTable 1 }

CoolingTemperatureSensorTableEntry ::= SEQUENCE {
                                             coolingSensorNumber  INTEGER,
                                             coolingSensorTemperature  Gauge,
45                                           coolingSensorLocation  DisplayString
               }
```

-42-

```
coolingSensorNumber OBJECT-TYPE
    SYNTAX INTEGER (1..5)
    ACCESS read-only
    STATUS mandatory
    DESCRIPTION
        "Unique logical temperature sensor number within this system."
    ::= { coolingTemperatureSensorTableEntry 1 } coolingSensorTemperature OBJECT-TYPE
    SYNTAX Gauge
    ACCESS read-only
    STATUS mandatory
    DESCRIPTION
        "Indicates the temperature Celsius measured by this sensor."
    ::= { coolingTemperatureSensorTableEntry 2 } coolingSensorLocation OBJECT-TYPE
    SYNTAX DisplayString (SIZE(0..255))
    ACCESS read-only
    STATUS mandatory
    DESCRIPTION
        "Indicates where this sensor is located to allow the user to
        identify the physical area showing a temperature problem. The
        sensor locations are as follows:

Sensor Number    Location on the NF9000-C
        1                'Component No. U15, on back plane'
        2                'Component No. U16, on back plane'
        3                'Component No. U69, on system board'
        4                'Component No. U68, on system board'
        5                'Component No. U67, on system board'

Sensor Number    Location on the NF9000-T
        1                'Component No. U15, on I/O board'
        2                'Component No. U16, on I/O board'
        3                'Component No. U69, on system board'
        4                'Component No. U68, on system board'
        5                'Component No. U67, on system board'
        "
    ::= { coolingTemperatureSensorTableEntry 3 }

--
-- THE POWER GROUP provides information on the power supplies.
--
powerSystemBoard5VoltLine OBJECT-TYPE
    SYNTAX INTEGER
```

```
                ACCESS read-only
                STATUS mandatory
                DESCRIPTION
                    "Indicates the current voltage of the +5V power line multiplied by
                    100."
                ::= { powerGroup 1 } powerSystemBoard3_3VoltLine  OBJECT-TYPE
                SYNTAX INTEGER
                ACCESS read-only
                STATUS mandatory
                DESCRIPTION
                    "Indicates the current voltage of the +3.3V power line multiplied by
                    100."
                ::= { powerGroup 2 } powerSystemBoard12VoltLine  OBJECT-TYPE
                SYNTAX INTEGER
                ACCESS read-only
                STATUS mandatory
                DESCRIPTION
                    "Indicates the current voltage of the +12V power line multiplied by
                    100."
                ::= { powerGroup 3 } powerSystemBoardNeg12VoltLine  OBJECT-TYPE
                SYNTAX INTEGER
                ACCESS read-only
                STATUS mandatory
                DESCRIPTION
                    "Indicates the current voltage of the -12V power line multiplied by
                    100."
                ::= { powerGroup 4 } powerSwitch OBJECT-TYPE
                SYNTAX INTEGER {
                            On(1),
                            Off(2)
                }
                ACCESS read-write
                STATUS mandatory
                DESCRIPTION
                    "Indicates the state of the main output from the power supplies.
                    Setting this switch to Off turns off the power to the entire system,
                    except for the Wire Service."
                ::= { powerGroup 5 }
```

```
           powerSystemResetSwitch OBJECT-TYPE
               SYNTAX INTEGER {
                              Reset(3)
               }
 5             ACCESS write-only
               STATUS mandatory
               DESCRIPTION
                     "Requests a system reset."
               ::= { powerGroup 6 }
10
           powerSupplyMaximumNumberOfPowerSupplies OBJECT-TYPE
               SYNTAX INTEGER (1..3)
               ACCESS read-only
               STATUS mandatory
15             DESCRIPTION
                     "Indicates the maximum number of power supplies supported by this
                     system."
               ::= { powerGroup 7 }

20         powerSupplyTable OBJECT-TYPE
               SYNTAX SEQUENCE OF PowerSupplyTableEntry
               ACCESS not-accessible
               STATUS mandatory
               DESCRIPTION
25                   "This table contains information on all the power supplies in the
                     system."
               ::= { powerGroup 8 } powerSupplyTableEntry OBJECT-TYPE
30             SYNTAX PowerSupplyTableEntry
               ACCESS not-accessible
               STATUS mandatory
               DESCRIPTION
                     "Describes a power supply."
35             INDEX { powerSupplyNumber }
               ::= { powerSupplyTable 1 }

PowerSupplyTableEntry ::= SEQUENCE {
                                            powerSupplyNumber INTEGER,
40                                          powerSupplySerialNumber
                                            DisplayString,
                                            powerSupplyDcState INTEGER,
                                            powerSupplyAcState INTEGER,
                                            powerSupplyLocation DisplayString
45             }
```

```
powerSupplyNumber OBJECT-TYPE
    SYNTAX INTEGER (1..4)
    ACCESS read-only
    STATUS mandatory
    DESCRIPTION
        "Uniquely identifies this power supply within the system."
    ::= { powerSupplyTableEntry 1 } powerSupplySerialNumber OBJECT-TYPE
    SYNTAX DisplayString (SIZE(0..255))
    ACCESS read-only
    STATUS mandatory
    DESCRIPTION
        "Indicates the serial number of this power supply."
    ::= { powerSupplyTableEntry 2 } powerSupplyDcState OBJECT-TYPE
    SYNTAX INTEGER {
                OK(1),
                OutOfRange(2),
                OutOfRangeOrAbsent(3)
    }
    ACCESS read-only
    STATUS mandatory
    DESCRIPTION
        "Indicates the state of the D/C power from this power supply.
        The NF9000-C returns OK or OutOfRange, while the NF9000-T
        returns OK or OutOfRangeOrAbsent.  The latter value may
        indicate a failure or an absent power supply."
    ::= { powerSupplyTableEntry 3 } powerSupplyAcState OBJECT-TYPE
    SYNTAX INTEGER {
                        OK(1),
                        OutOfRange(2),
                        Unavailable(3)
    }
    ACCESS read-only
    STATUS mandatory
    DESCRIPTION
        "Indicates the state of the A/C power to this power supply."
    ::= { powerSupplyTableEntry 4 } powerSupplyLocation OBJECT-TYPE
    SYNTAX DisplayString (SIZE(0..255))
    ACCESS read-only
```

-46-

```
            STATUS mandatory
            DESCRIPTION
                    "Describes the location of this power supply. The power supply
                    locations on the NF9000-C are as follows:
                    'Top receptacle', 'Bottom receptacle.'

The power supply locations on the NF9000-T are as follows:
                    'Bottom receptacle,' 'Middle receptacle,' 'Top receptacle'
                    "
            ::= { powerSupplyTableEntry 5 }

--
    -- THE CPU GROUP of objects provides information on the system CPUs.
    -- cpuBusToCoreRatio OBJECT-TYPE
            SYNTAX DisplayString (SIZE(1..6))
            ACCESS read-only
            STATUS mandatory
            DESCRIPTION
                    "Indicates the Bus-to-CPU frequency ratio."

Ratio   CPU Speed (MHz)
                    1/2     133
                    1/3     200
                    1/4     266
                    2/5     166
                    2/7     233
                    "
            ::= { cpuGroup 1 } cpuClockFrequency OBJECT-TYPE
            SYNTAX INTEGER (133..266)
            ACCESS read-only
            STATUS mandatory
            DESCRIPTION
                    "Indicates the CPU's clock frequency in MHz."
            ::= { cpuGroup 2 } cpuMaximumNumberOfCpus OBJECT-TYPE
            SYNTAX INTEGER (1..4)
            ACCESS read-only
            STATUS mandatory
            DESCRIPTION
                    "Indicates the maximum number of CPUs supported by this system."
            ::= { cpuGroup 3 }
```

-47-

```
cpuTable OBJECT-TYPE
    SYNTAX SEQUENCE OF CpuTableEntry
    ACCESS not-accessible
    STATUS mandatory
    DESCRIPTION
        "This table describes the CPU's attributes and state."
    ::= { cpuGroup 4 } cpuTableEntry OBJECT-TYPE
    SYNTAX CpuTableEntry
    ACCESS not-accessible
    STATUS mandatory
    DESCRIPTION
        "Describes a CPU."
    INDEX { cpuNumber }
    ::= { cpuTable 1 }

CpuTableEntry ::= SEQUENCE {
                        cpuNumber INTEGER
                        cpuNumber INTEGER
} cpuNumber OBJECT-TYPE
    SYNTAX INTEGER {1..4}
    ACCESS read-only
    STATUS mandatory
    DESCRIPTION
        "Indicates a unique CPU number in the system."
    ::= { cpuTableEntry 1 } cpuState OBJECT-TYPE
    SYNTAX INTEGER {
                        UnknownFailure(1),
                        Normal(2),
                        TemperatureFailure(3),
                        PowerFailure(4)
}
    ACCESS read-only
    STATUS mandatory
    DESCRIPTION
        "Indicates whether this CPU has failed, and the cause of the
        failure."
    ::= { cpuTableEntry 2 }
```

```
--
-- THE SLOT FAN GROUP of objects provides information on the NF9000-T
-- I/O slot fans.  The slotFanTable is empty for the NF9000-C.
--
slotFanMaximum NumberOfFans OBJECT-TYPE
    SYNTAX INTEGER (0..2)
    ACCESS read-only
    STATUS mandatory
    DESCRIPTION
        "Indicates the maximum number of I/O slot fans supported by this
        system.  The NF9000-C supports O I/O slot fans."
    ::= { slotFanGroup 1 } slotFanTable OBJECT-TYPE
    SYNTAX SEQUENCE OF SlotFanTableEntry
    ACCESS not-accessible
    STATUS mandatory
    DESCRIPTION
        "Describes the programmable fans on the system board."
    ::= { slotFanGroup 2 } slotFanTableEntry OBJECT-TYPE
    SYNTAX SlotFanTableEntry
    ACCESS not-accessible
    STATUS mandatory
    DESCRIPTION
        "Describes a programmable fan."
    INDEX { slotFanNumber }
    ::= { slotFanTable 1 }

SlotFanTableEntry ::= SEQUENCE {
                            slotFanNumber INTEGER,
                            slotFanMinSpeed INTEGER,
                            slotFanSpeedSetting INTEGER,
                            slotFanSpeed Gauge,
                            slotFanFault INTEGER,
                            slotFanLocation DisplayString
                            }
slotFanNumber OBJECT-TYPE
    SYNTAX INTEGER (1..2)
    ACCESS read-only
    STATUS mandatory
    DESCRIPTION
        "Indicates the number of this fan."
    ::= { slotFanTableEntry 1 }
```

-49-

```
slotFanMinSpeed OBJECT-TYPE
    SYNTAX INTEGER (0..255)
    ACCESS read-write
    STATUS mandatory
    DESCRIPTION
        "Indicates the minimum fan 2 speed (in RPS-Revolutions Per
        Second) that causes a fault."
    ::= { slotFanTableEntry 2 } slotFanSpeedSetting OBJECT-TYPE
    SYNTAX INTEGER {
                    Low(1),
                    High(2)
            }
    ACCESS read-write
    STATUS mandatory
    DESCRIPTION
        "Indicates the current fan speed setting.  Normally it is low.  If
        High, it means that one of the other I/O slot fans speed is below
        the minimum limit."
    ::= { slotFanTableEntry 3 } slotFanSpeed OBJECT-TYPE
    SYNTAX Gauge
    ACCESS read-only
    STATUS mandatory
    DESCRIPTION
        "Measured this fan speed in RPS (Revolutions Per Second)."
    ::= { slotFanTableEntry 4 } slotFanFault OBJECT-TYPE
    SYNTAX INTEGER {
                    Yes(1),
                    No(2)
            }
    ACCESS read-only
    STATUS mandatory
    DESCRIPTION
        "Indicates the current state of this fan."
    ::= { slotFanTableEntry 5 } slotFanLocation OBJECT-TYPE
    SYNTAX DisplayString (SIZE(0..255))
    ACCESS read-only
    STATUS mandatory
    DESCRIPTION
```

```
                    "Indicates where this fan is located to allow the user to physically
                    reach it in case of malfunction.
                    The fan locations are as follows (unchecked):

5                   slotFanNumber    slotFanLocation
                    1                'Front view of I/O board, first from the left'
                    2                'Front view of I/O board, second from the left'
                    "
                    ::= { slotFanTableEntry 6 }
10      END
``` loading device drivers, and variables identifying instructions for configuring device drivers.

The Slot Group

The slot group includes MIB variables representing I/O expansion slots in a server computer 204. The MIB variables in the slot group represent the capability of various expansion slots to be powered off or on either individually or on a per canister basis (a canister is a device containing multiple expansion slots). Information on the availability (whether in a canister or currently occupied by a card) and power state of expansion slots is also represented by the MIB variables of this group.

The Canister Group

The canister group includes MIB variables representing canisters and their components. Each canister has multiple expansion slots. The canister group MIB variables represent information on each canister, including the respective name, serial number, revision number, type, power state, location, and fans.

The System Group

The system group includes MIB variables representing information related to the server computer 204. For example, serial numbers, description, and revision data for hardware components are represented by MIB variables in this group, as well as information about memory, system time and date.

The Cooling Group

The cooling group includes MIB variables representing the devices used to cool the server computer's 204 components. The MIB variables in this group include information about system board fans and temperature sensors.

The Power Group

The MIB variables in the power group represent information about power supplies (e.g., serial number, DC state, AC state, and location), physical power switches, the reset button, and voltage sensors on the system board.

The CPU Group

The cpu group includes MIB variables representing information about system CPUs such as clock frequency, bus-to-core ratio, as well as CPU state.

The Slot Fan Group

The MIB variables in the slot fan group represent information about I/O expansion slot cooling fans.

Software modules such as Maestro 208 and the SNMP extension agent 210 incorporate groups of MIB variables for use in managing network-based components. That incorporation process generally begins with designing a MIB and then compiling it to produce a binary MIB file.

Figure 4:
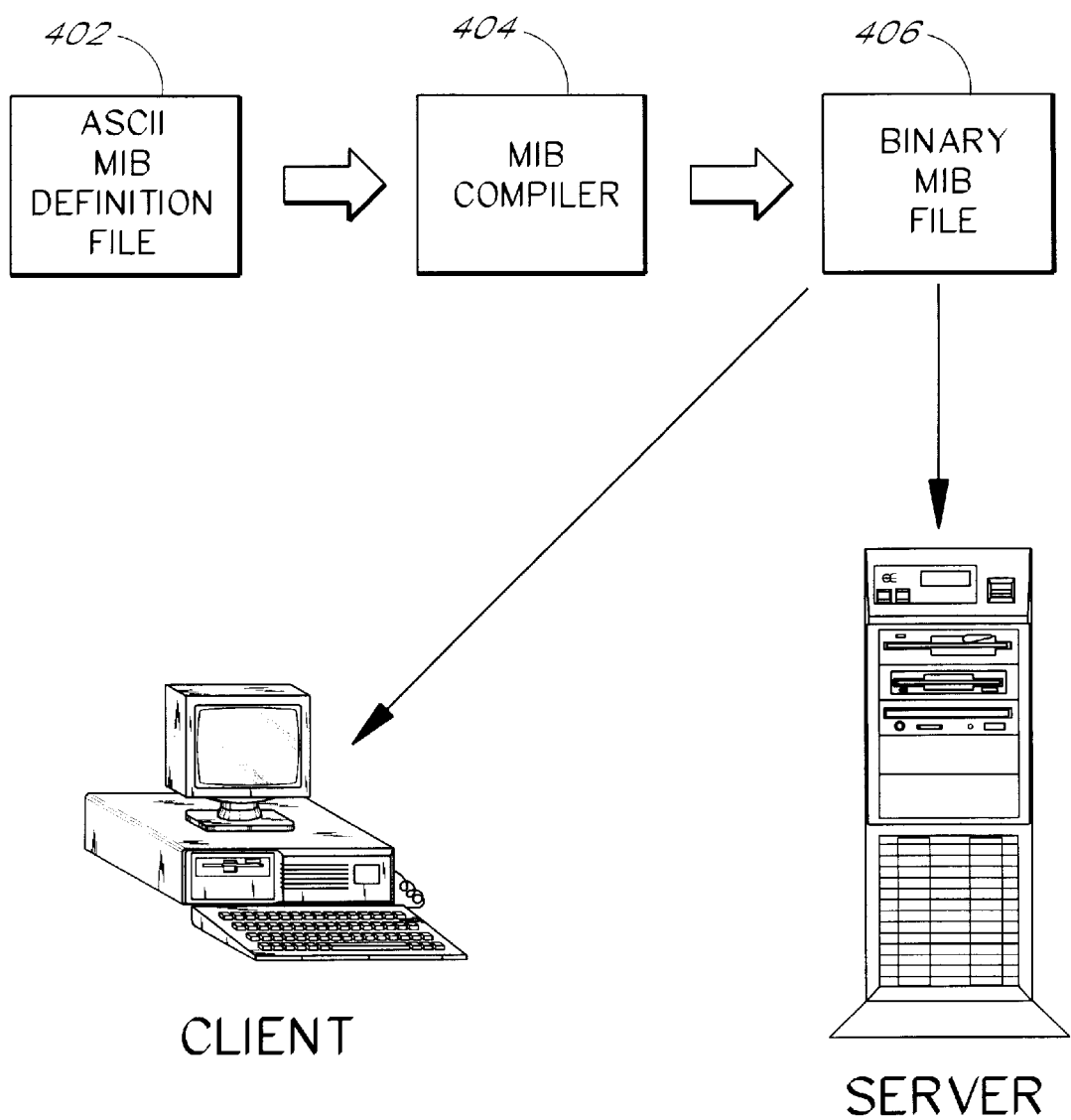
FIG. 4 illustrates a block diagram representing the process of compiling and distributing a MIB.

FIG. 4 represents a block diagram illustrating the process of creating and distributing a binary MIB file. After identifying a set of variables corresponding to characteristics, capabilities or states of network-based components which might need to be accessed, acquired or altered to perform desired management operations, a MIB designer generally prepares a MIB definition file 402 containing a formal, syntactically correct MIB specification (sometimes referred to as a MIB module). The MIB specification defines various attributes for each variable according to the ISO 8824 standard which provides generally that each variable have an OBJECT-TYPE identifier (or variable name), a SYNTAX specification (or data type such as integer, string, etc.), and an ACCESS descriptor (e.g., whether the variable may be written or is read-only).

The MIB designer inputs the MIB definition file (typically an ASCII text file) into a MIB compiler 404. MIB compilers are known in the art. Products such as IBM's NetView/6000™ or Hewlett-Packard's Openview Network Node Manager™ provide MIB compilers. The MIB compiler 404 reads and processes the ASCII MIB definition file 402 and produces a binary MIB file 406 as output. In one embodiment, the binary MIB file is called a "MIB.INI" file. A network administrator copies the binary MIB file 406 to local computer storage media such as a hard disk drive of each client computer 202 and server computer 204 attached to the network 200.

After one or more groups of MIB variables are defined (at least given names and data type specifications), a programmer may design a software module like Maestro 208 which can use the defined MIB variables to manage network-based components by forming SNMP requests including the MIB variables and sending those requests to managed components.

A programmer may also design a software module to be responsive to SNMP requests that are based on certain defined MIB variables. Generally, SNMP agent modules respond to SNMP requests using MIB variables fixed by standard. Software modules responsive to SNMP requests based on newly defined MIB variables are sometimes called SNMP extension agents which cooperate with an SNMP agent, the SNMP extension agent responding only to SNMP requests not processed by the SNMP agent.

Management software modules, like Maestro 208, generate and send SNMP requests, and agent software modules, like the SNMP extension agent 210, receive and respond to SNMP requests. The format of an SNMP request includes a request (or message) type (i.e., GET_REQUEST, GET_NEXT_REQUEST, SET_REQUEST) and a variable/value pair.

The variable in the variable/value pair corresponds to a MIB variable (which may be called an object identifier). The value in the variable/value pair represents storage space for a data value which may be ignored or may contain a value represented by the variable. In the case of a request of type GET_REQUEST or GET_NEXT_REQUEST, a management software module generally seeks information from a managed computer (or component or device), the specific information identified by the variable, and the value may be ignored when such a request is transmitted. The managed computer generally ascertains the information sought and stores the discovered information in the storage space for the value and sends the response to the management software module.

In one embodiment, an example of a variable/value pair for an SNMP request of type GET_REQUEST is (1.3.6.1.4.1.837.2.4.1.1.6.2.1,0 ). In this example, the variable represents the following node pathway: iso, org, dod, internet private, enterprise, netframe, nf9000mgmt, slotGroup, slotTable, slotTableEntry, slotPowerState, slotGroupNumber2, slotNumber1. The value (the second member of the variable/value pair) is 0 on transmission, but the management software may expect the value to be supplied by an SNMP agent module running on the managed computer which sends to the management software a response message having a format similar to that of the request. In one embodiment, a management software module, like Maestro 208, may send the example SNMP request to a server computer to request the power state (whether power is supplied or not) of the first I/O expansion slot in the second group (or canister) of I/O expansion slots. In a corresponding response message, the same variable may be sent, along with a value=1 (e.g. power to the slot is ON) by an SNMP agent module to the management software module.

In the case of a request of type SET_REQUEST, the value represents an actual value to be assigned to some component or device indicated by the variable. In one embodiment, an example of a variable/value pair for an SNMP request of type SET_REQUEST is (1.3.6.1.4.1.837.2.4.1.1.6.2.1, 1). A management software module like Maestro 208 might send this example SNMP request to cause power to be supplied to the first expansion slot of the second expansion slot group. The value 1 corresponds to power state ON, and the request type, SET_REQUEST, indicates to receiving agent software, such as the SNMP extension agent 210, that the component identified by the variable is to be set according to the value (e.g., 1). Accordingly, the agent software takes steps to power the identified slot.

Generally, a programmer designs software functions or routines which request MIB variable information, or which use or acquire MIB variable information in communicating directly with hardware components, with system services, or with drivers. Those of ordinary skill in the art will appreciate that, in one embodiment, the MIB variables represented in a binary MIB file are exposed to programmer-designed modules or routines and that the routines are registered with an SNMP service.

Software modules designed and developed to use MIB variables can be written in a wide variety of programming languages, such as C, C++, or Pascal, and such software modules may or may not be arranged in an object-oriented format. The present invention is not limited by a programming language. Some MIB compilers assist the development of software modules using MIB variables by automatically generating skeletal outlines of software code, including data declarations corresponding to MIB variables, that may efficiently be used to set or obtain values in a managed device. Those of ordinary skill will appreciate that, in one embodiment, an SNMP extension agent may be designed to respond to requests concerning particular MIB variable by generating, in C programming language terms, a large switch block which simply associates groups of programming language instructions with case statements corresponding to MIB variables. In this embodiment, program execution may efficiently branch based simply on MIB variables.

In the embodiment illustrated in FIG. 2, a MIB extended to define groups of variables for hot plug operations (a hot plug MIB) is compiled to generate a binary hot plug MIB file. The hot plug MIB includes hot plug group nodes: trapGroup node 312, adapterGroup node 314, driverGroup node 316, slotGroup node 318, and canisterGroup node 320. The binary hot plug MIB file exposes to Maestro 208 and to the SNMP extension agent 210 the variables within each hot plug group. The variables defined in the hot plug groups are described below.

Trap Information

While some hot plug operations are routine and preventive in nature, other hot plug operations are performed in response to failures or pending failures of components of the server computer 204. If and when alerted that a failure has occurred or is pending, a network administrator can quickly take action to learn the precise cause of the failure and then remedy the failure. The hot plug MIB variables defined in the trapGroup 312 provide information useful in identifying faulty components of a server computer 204.

The following diagram represents the hot plug MIB variables defined in the trapGroup 312.

| trapGroup | |
|---|---|
| 1 | trapCpu |
| 2 | trapSystemBoardFan |
| 3 | trapTemperature |
| 4 | trapPowerSupply |
| 5 | trapCanister |
| 6 | trapAdapter |
| 7 | trapSlotFan |
| 8 | trapCanisterFan |

The trapCpu variable reports the number of a failed CPU. This number can be used to index another variable (e.g., a cpuTable) to retrieve more information on the failed CPU.

The trapSystemBoardFan variable reports the number of a failed system Board fan, indicating that a fan speed dropped below the minimum limit allowed. The fan number represented by this variable can be used to index another variable (e.g. a coolingFanTable variable) to retrieve more information on the failed fan.

The trapTemperature variable reports the number of a temperature sensor that detected a "normal" to "warning" transition (i.e., the temperature raised above the threshold "warning" level which, in one embodiment, is defined by the variable coolingAlertTemperature in the Cooling Group).

The trapPowerSupply variable reports the number of a power supply that has been extracted/inserted or that has detected an AC/DC failure. In one embodiment, this number can be used to index another variable (e.g., a powerSupplyTable variable) to retrieve more information on the power supply that caused this trap.

The trapCanister variable reports the name of a canister that has been either extracted or inserted. The trapAdapter variable reports the number of an adapter that is malfunctioning. In one embodiment, this number can be used to index another variable (e.g., an adapterTable variable) to retrieve more information on the related adapter.

The trapSlotFan variable reports the number of an I/O slot fan that failed (i.e., dropped below a threshold minimum speed). The fan number represented by this variable can be used to index another variable (e.g., a slotFanTable variable) to retrieve more information on the failed fan.

The trapCanisterFan variable reports the name of a canister whose cooling system failed (i.e., the speed of at least one of the canister's fans dropped below the threshold minimum speed).

Adapter Information

In one embodiment, a hot plug MIB includes an adapterGroup node 314 which defines and groups variables used for performing hot plug operations involving adapters of the server computer 204. Certain information may be very useful in determining whether and how to perform hot plug operations on adapters.

For example, not all adapters support hot plug procedures. Thus, before performing a hot plug procedure on a particular adapter, it may be useful to determine whether the adapter supports a hot plug procedure. It may also be useful to determine the state of an adapter (e.g., failed, malfunctioning, working normally, or suspended) and also to identify the commands an adapter responds to (e.g., suspend, resume, reset, etc.). Also, identifying the physical bus connected to an adapter and which device driver is servicing an adapter may expedite hot plug operations on an adapter. Hot plug MIB variables of the adapter group conveniently represent that and other information and make such information easily accessible to software modules such as Maestro 208 and the SNMP extension agent 210 which control hot plug operations on adapters of a server computer 204.

The following diagram represents the hot plug MIB variables defined in the adapterGroup 314.

```
adapterGroup
    1  adapterTable
        1  adapterTableEntry
            1   adapterNumber
            2   adapterName
            3   adapterSupportsHotSwapHotAdd
            4   adapterState
            5   adapterCommand
            6   adapterDriverNumber
            7   adapterBusNumber
            8   adapterDeviceNumber
            9   adapterFunctionNumber
           10   adapterVendorId
           11   adapterDeviceId
           12   adapterRevisionId
           13   adapterBaseClass
           14   adapterSubClass
           15   adapterProgrammingInterface
```

The adapterTable variable describes all adapters in the server computer 204, while the adapterTableEntry variable describes each adapter. The adapterNumber variable provides a unique logical number of a particular adapter, and in each case may be an integer greater than one which serves as an index into the adapterTable.

The adapterName variable specifies a unique name of an adapter in a ASCII character string format (the string would be empty when a name is not available). The adapterSupportsHotSwapHotAdd is an integer variable indicating whether a particular adapter supports (if value=1) or does not support (if value=2) hot swap or hot add operations.

The adapterState variable, another integer variable, indicates the current state of a particular adapter (1=unclaimed (no driver loaded for the adapter), 2=unknown (adapter not responsive or does not support hot plug operations, in either case no commands should be sent to the adapter), 3=failed (driver or adapter is malfunctioning), 4=active (driver and adapter are working normally), 5=suspended (the adapter's operation has been suspended)).

The adapterCommand variable, also an integer, indicates the commands that may be sent to an adapter (1=reset (causes adapter to re-initialize and resume operations), 2=suspend (suspends operations of the adapter in preparation for hot add or hot swap), 3=forcesuspend (forcefully suspends operations of the adapter in preparation for hot add or hot swap), 4=resume (causes adapter to resume operations)).

The adapterDriverNumber variable indicates the logical number of the driver handling a particular adapter, and may be an integer useful for indexing into the driverTable to retrieve attributes of a driver. The adapterBusNumber indicates a bus number for a particular adapter and, in one embodiment, represents a physical PCI number.

The adapterDeviceNumber variable indicates a device number of a particular adapter and may, in one embodiment, represent a physical PCI device number. The adapterFunctionNumber variable provides a function number of a particular adapter and may represent a PCI function number in one embodiment. The adapterVendorID variable indicates a vendor identification code for a particular adapter which may comply with a PCI vendor identification format. The adapterDeviceID variable indicates a device identification code for a particular adapter which, in one embodiment, may represent a PCI device identification code.

The adapterRevisionID variable indicates a revision identification code for a particular adapter and, in one embodiment, may represent a PCI revision identification code. The adapterBaseClass variable identifies a Base Class code for a particular adapter and may, in one embodiment be a PCI Base Class code. The adapterSubClass variable identifies a Sub Class code for a particular adapter and may represent a PCI Sub Class code in one embodiment. The adapterProgrammingInterface variable represents a Programming Interface code for a particular adapter and, in one embodiment, represents a PCI programming Interface code.

It will be readily appreciated by those of ordinary skill in the art that differently named MIB variables having different value ranges may be used to represent information useful for performing hot plug operations on adapters in a server computer.

Driver Information

Device drivers govern the exchange of information (provide an interface) between some hardware components of a server computer and software modules running on the server computer. Device drivers may also poll (test or examine values or characteristics of) hardware, send commands to hardware, or set parameters affecting operation of hardware. In one embodiment, device drivers may suspend or resume their interaction with a hardware component and may be requested to do so during hot plug operations. Suspend and resume states of device drivers are described in greater detail in the U.S. patent application entitled "HOT ADD OF DEVICES SOFTWARE ARCHITECTURE" and having attorney docket no. MNFRAME.006A1 filed, along with the present application, on Oct. 1, 1997. Hot plug MIB variables in the driverGroup 316 include information useful for identifying a driver servicing a particular hardware component (e.g., an adapter in one embodiment).

The following diagram represents the hot plug MIB variables defined in the driverGroup 316 representing information about drivers useful in performing hot plug operations.

```
driverGroup
    1  driverTable
        1  driverTableEntry
            1   driverNumber
            2   driverName
            3   driverVersion
```

The driverTable variable describes attributes of device drivers servicing components which may be involved in hot plug operations performed on a server computer. The driverTable variable may be populated differently depending on an operating system. For example, under the Windows NT™ operating system, the table may include information for drivers servicing hardware components (e.g., adapters) which support hot plug operations.

The driverTableEntry variable contains attributes of particular device drivers, including driverNumber, driverName, and driverVersion. The driverNumber variable represents the unique logical number of a driver and, in one embodiment represents an integer value which can be used as an index into the driverTable variable. The driverName variable is an ASCII character string representing a unique name of a driver. The driverVersion variable identifies the version of a driver in the form of an ASCII string. Because different versions of device drivers may behave differently, it may be useful to identify the version number of a device driver servicing a hardware component (e.g., an adapter) to adjust interaction with the driver. It will be understood by those of ordinary skill that differently named MIB variables with different ranges of values may represent driver information useful to perform hot plug operations.

Slot Information

To perform hot plug operations on components (such as adapters) interacting with I/O expansion slots, various information about the expansion slots may be useful. For example, software modules such as Maestro 208 or the SNMP extension agent 210 which control hot plug operations related to expansion slots may favorably use information indicating whether an expansion slot is occupied (e.g., an adapter is inserted into the slot), whether power is being supplied to a slot, what value (numeric or otherwise) should be used to identify a slot, and which bus operations may be suspended during a hot plug operation involving a particular slot. Hot plug MIB variables in the slotGroup 318 represent that and other information about I/O expansion slots useful in performing hot plug operations on devices interacting with the expansion slots.

The following diagram represents the hot plug MIB variables defined in the slotgroup 318 representing information about I/O expansion slots useful in performing hot plug operations.

```
slotGroup
  1  slotTable
       1  SlotTableEntry
            1  slotGroupNumber
            2  slotNumber
            3  slotBusNumber
            4  slotDeviceNumber
            5  slotAdapterPresence
            6  slotPowerState
            7  slotLocation
```

The slotTable variable describes all I/O expansion slots in a server computer 204. The slotTableEntry variable describes particular I/O expansion slots. In one embodiment, the slotTable defines information about PCI slots. A PCI slot may be identified by paired values corresponding to bus number and device number.

The slotGroupNumber variable (the first entry of the slotTableEntry variable) represents a group of slots to which a single slot may belong. In one embodiment a server computer 204 has only one group of I/O expansion slots, and thus the slotGroupNumber may have a value of one. In another embodiment, a server computer may have groups of slots where each group corresponds to a canister and each canister has multiple (e.g., 4) I/O expansion slots. In such an embodiment, the slotGroupNumber identifies the canister (or group of I/O expansion slots) to which a slot belongs. The slotGroupNumber variable, in one embodiment, can also be used as an index into the canisterTable (described below).

The slotNumber variable indicates a logical slot number identifying a slot within a group of slots (e.g. a value of 3 may correspond to the third slot in a four-slot canister). The slotBusNumber variable represents a value identifying the bus on which a particular slot resides and, in one embodiment, may represent a physical PCI bus number. The slotDeviceNumber variable represents the device number of a particular slot and, in one embodiment, may represent the physical PCI device number.

The slotAdapterPresence variable indicates whether an adapter is present in a particular slot and, in one embodiment, the slotAdapterPresent variable is an integer (e.g., 1=card present in slot, 2=no card present in slot).

The slotPowerState variable indicates whether a particular slot has power. In one embodiment the slotPowerState variable is an integer (e.g., 1=power to slot is on, 2=power to slot is off, 3=unavailable (used for example when slots are grouped in canisters and the canisters, rather than the individual slots, are optionally powered)).

The slotLocation variable indicates the physical location of a particular I/O expansion slot, in one embodiment according to paired integer values corresponding respectively to slot group number and logical slot number (e.g., (2,4) identifies the fourth slot in the second group of slots). One of ordinary skill in the art will recognize that differently named MIB variables having ranges of values differing from those described above may represent information about I/O expansion slots useful in performing hot plug operations.

Canister Information

The canisterGroup node 320 defines hot plug MIB variables representing information useful in performing hot plug operations on server computers which organize I/O expansion slots into canisters such that each canister contains multiple I/O expansion slots. The canisterGroup 320 hot plug MIB variables include information describing, for example, the maximum number of canisters in a server computer, the name of a canister (corresponding to a name which may visibly and readably appear on the canister), the power state of the canister (which generally supplies power to all hardware components, such as adapters, occupying slots of the canister), and the physical location of the canister.

The following diagram represents the hot plug MIB variables defined in the canisterGroup 320 representing information about canisters holding multiple I/O expansion slots, such information being useful in performing hot plug operations involving hardware components connected to the expansion slots.

```
canisterGroup
  1  canisterMaximumNumberOfCanisters
  2  canisterTable
       1  canisterTableEntry
            1  canisterNumber
            2  canisterName
            3  canisterSerialNumber
            4  canisterRevisionInfo
            5  canisterDescription
            6  canisterPowerState
            7  canisterLocation
            8  canisterFanMinSpeed
            9  canisterFanSpeedSetting
           10  canisterFan1Speed
           11  canisterFan1Fault
           12  canisterFan2Speed
           13  canisterFan2Fault
```

The canisterMaximumNumberOfCanisters variable indicates the maximum number of canisters supported by a system. In one embodiment, a server computer can hold at most four canisters while, in another embodiment, a server computer has no (0) canisters.

The canisterTable variable describes the attributes of all the canisters in the system, while the canisterTableEntry variable describes a particular canister. The canisterNumber variable represents a unique number (e.g., an integer) identifying a canister. The canisterName variable comprises an ASCII character string identifying a canister (e.g., "A" or "B"). The canisterSerialNumber variable represents the serial number of a canister.

The canisterRevisionInformation variable indicates the revision number and date of the canister's controller. The canisterDescription variable provides an ASCII character string containing a short description of a canister. The canisterPowerState variable indicates whether the canister has power (e.g., an integer value where 1=canister has power, 2=canister has no power).

The canisterLocation variable describes the physical location of a canister. For example, in one embodiment wherein the canisters are located in quadrants, "A" denotes the top left canister location, "B" denotes the top right canister location, "C" denotes the bottom left canister location, and "D" denotes the bottom right canister location.

The canisterFanMinSpeed variable represents a minimum fan speed in revolutions per second below which a fault condition occurs. The canisterFanSpeedSetting variable indicates the current fan speed in revolutions per second. In one embodiment, the canisterFanSpeedSetting is an integer where 1=low speed and 2=high speed.

In an embodiment where each canister of a server computer contains two cooling fans, the canisterFanOneSpeed variable represents the current speed of fan number one in revolutions per second. The canisterFanOneFault variable indicates the current state of fan number one (e.g., 1=fan faulted, 2=fan OK). Like the canisterFanOneSpeed variable, the canisterFanTwoSpeed variable represents the current speed of fan number two in revolutions per second. The canisterFanTwoFault variable indicates whether fan number two is operating or has faulted. One of ordinary skill will understand that hot plug MIB variables which represent information about canisters useful in hot plug operations may have names or value ranges different from the canister hot plug MIB variables defined above. Moreover, one of ordinary skill will recognize that many techniques exist for defining and grouping variables and that the present invention is not limited by a MIB or the MIB format.

Figure 5:
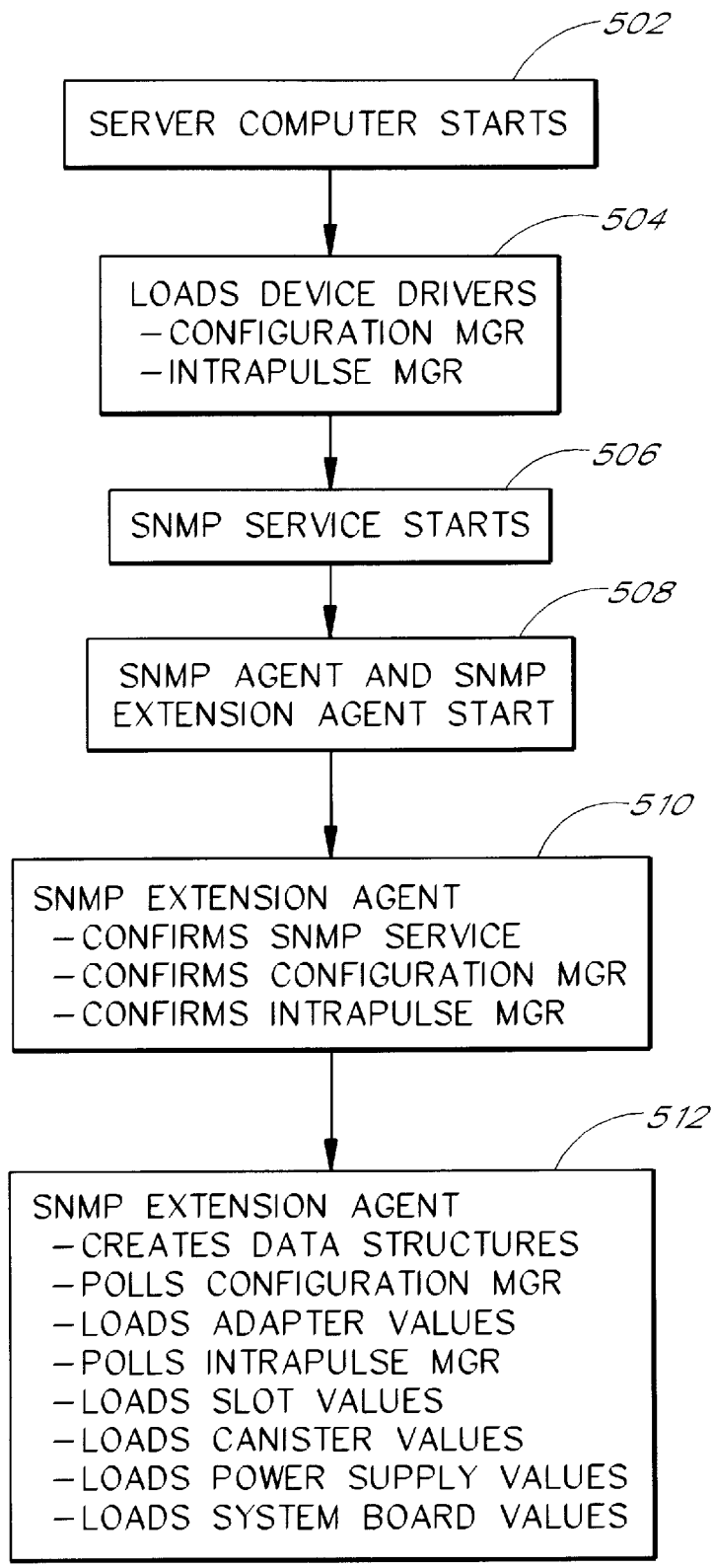
FIG. 5 illustrates one sequence of steps performed to acquire hot plug MIB variables for a server computer.

FIG. 5 illustrates a sequence of steps to create hot plug MIB variables 214 maintained by the SNMP extension agent 210. In a first step 502, the server computer 204 starts. The server computer 204 is typically started (powered on) by a network administrator.

In another step 504, the operating system software running on the server computer 204 loads device drivers, including configuration manager 218 and Intrapulse manager 220. In a further step 506, SNMP service starts. In a still further step 508, SNMP agent 209 and SNMP extension agent 210 start.

In a step 510, the SNMP extension agent 210 confirms that the SNMP service is running on the server computer 204. In the step 510, the SNMP extension agent also confirms that the configuration manager 218 and Intrapulse manager 220 are also running on the server computer 204. In one embodiment, if any of the SNMP service, the configuration manager 218 or the Intrapulse manager 220 are not running, the SNMP extension agent causes a message to be displayed warning a network administrator that the SNMP extension agent 210 has detected that certain other software is not running (the message may also indicate the name of the software module), the message may also suggest that the network administrator load or start a software module.

In a further step 512, the SNMP extension agent 210 creates data structures corresponding to hot plug MIB variables 214. Initially, the data structures are not populated with values corresponding to hot plug MIB variables. The SNMP extension agent 210 calls the configuration manager 218 requesting adapter and driver data. The configuration manager which, in one embodiment, communicates with the BIOS (basic input/output system) of the server computer 204, polls the adapters in the server computer 204 and determines associated drivers and provides to the SNMP extension agent 210 data values relating to adapters and drivers in the server computer 204. In the step 512, the SNMP extension agent 210 loads the adapter and driver values received from the configuration manager 218 into the data structures created earlier.

The SNMP extension agent 210, in the step 512, calls the Intrapulse manager 220 requesting information about I/O expansion slots, canisters, power supplies, and system boards. The Intrapulse manager 220 which, in one embodiment, communicates with the BIOS of the server computer 204, polls the slots, canisters, power supplies and system boards of the server computer 204 and provides to the SNMP extension agent 210 data values corresponding to each of those components. The SNMP extension agent 210 then loads the I/O expansion slot data, the canister data, the power supply data, and the system board data into the data structures. Thus the SNMP extension agent 210 acquires hot plug MIB variables 214 shortly after the server computer 204 starts. One of ordinary skill will recognize that the SNMP extension agent 210 may call device drivers differing from those described above to request information related to hot plug MIB variables and will also recognize that such device drivers may poll hardware components differing from those described above. The present invention is thus not limited by device drivers or polled hardware components.

Maestro 208 maintains hot plug MIB variables 212 by periodically executing a retrieve_data routine. In one embodiment, a software timer provided by an operating system produces a timer event at a predetermined time interval. Such software timers are known in the art and the present invention is not limited by a software timer. The retrieve_data routine responds to the timer event by executing. Thus, the retrieve_data routine may execute at predetermined time intervals. The retrieve_data routine generates and sends SNMP requests (e.g., requests of type GET_REQUEST or GET_NEXT_REQUEST specifying particular hot plug MIB variables) over the network 200 to the server computer 204. In one embodiment, each request generated and sent by the retrieve_data routine seeks one MIB variable value. The SNMP extension agent 210 receives the requests, polls or queries the components identified by MIB variables in the requests, and sends response messages to the client computer 102. In one embodiment, each response message includes the value of one MIB variable. Maestro 208 receives the requests and updates the hot plug MIB variables 212.

By executing the retrieve_data routine at predetermined time intervals, Maestro 208 ensures that the hot plug MIB variables 212 are current. One of ordinary skill in the art will appreciate, however, that the degree to which the hot plug MIB variables 212 are current relates to the time interval between executing the retrieve_data routine. In one embodiment, the time interval may be changed by a user.

In another embodiment, the retrieve_data routine runs on the server computer 204 and executes periodically to refresh the hot plug MIB variables 214 stored in computer readable media on the server computer 204. Moreover, at periodic intervals, a broadcast_hot_plug_MIB_data routine periodically executes on the server computer 204. The broadcast_hot_plug_MIB_data routine causes hot plug MIB variable data to be refreshed on client computers. In one embodiment, SNMP agent software running on a server computer 204 periodically generates a TRAP_Hot_Plug_Variables message. In another embodiment, SNMP agent software generates a TRAP_Hot_Plug_Variable message in response to configuration changes affecting the components of a server computer 204. While TRAP requests typically correspond to alert conditions, the SNMP agent software generates a TRAP_Hot_Plug_Variable message to signal a refresh event for hot plug MIB variables. In this embodiment, the SNMP agent software sends the TRAP_Hot_Plug_Variable message to one or more client computers. A client computer receives the TRAP_Hot_Plug_Variable request and, in response, executes the retrieve_data routine to refresh the hot plug MIB variables 212.

In an alternative embodiment, a management software module runs on the server computer 204 and issues an execute retrieve request to one or more client computers, requesting that the client computer 202 execute a retrieve_data routine. An SNMP agent module on the client computer receives the execute retrieve request and executes the retrieve_data routine on the client computer. The retrieve_data routine retrieves and stores hot plug MIB variables 212 as described above. Those of ordinary skill in the art will appreciate that other methods exist for periodically broadcasting hot plug MIB variable data from a server computer 204 to a client computer 202.

In still another embodiment, the network administrator directs Maestro 208 to execute the retrieve_data routine. It will be appreciated by those of ordinary skill that manual executions of the retrieve_data routine may be combined with timed execution of the retrieve_data routine.

Figure 6:
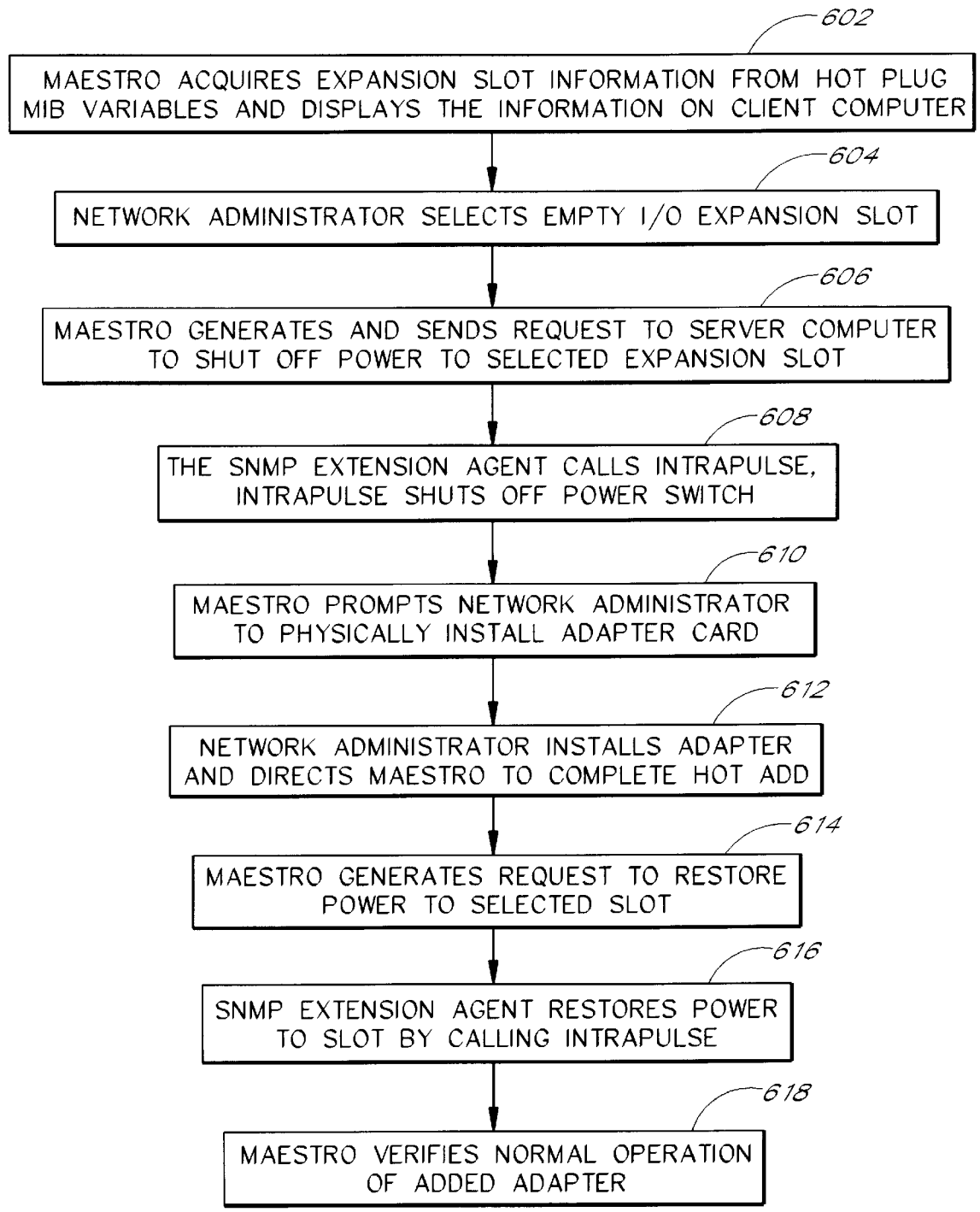
FIG. 6 illustrates one sequence of steps performed to hot plug an adapter to a server computer.

FIG. 6 illustrates steps performed in hot adding an adapter card to an I/O expansion slot of a server computer 204 which does not use canisters. In a first step 602, Maestro 208 accesses I/O expansion slot information from the hot plug MIB variables 212 and displays information identifying empty expansion slots (i.e., expansion slots currently not holding an adapter card or other device) to a network administrator on a computer monitor of the client computer 202. The displayed expansion slot information corresponds to the current configuration of the server computer 204.

Figure 7:
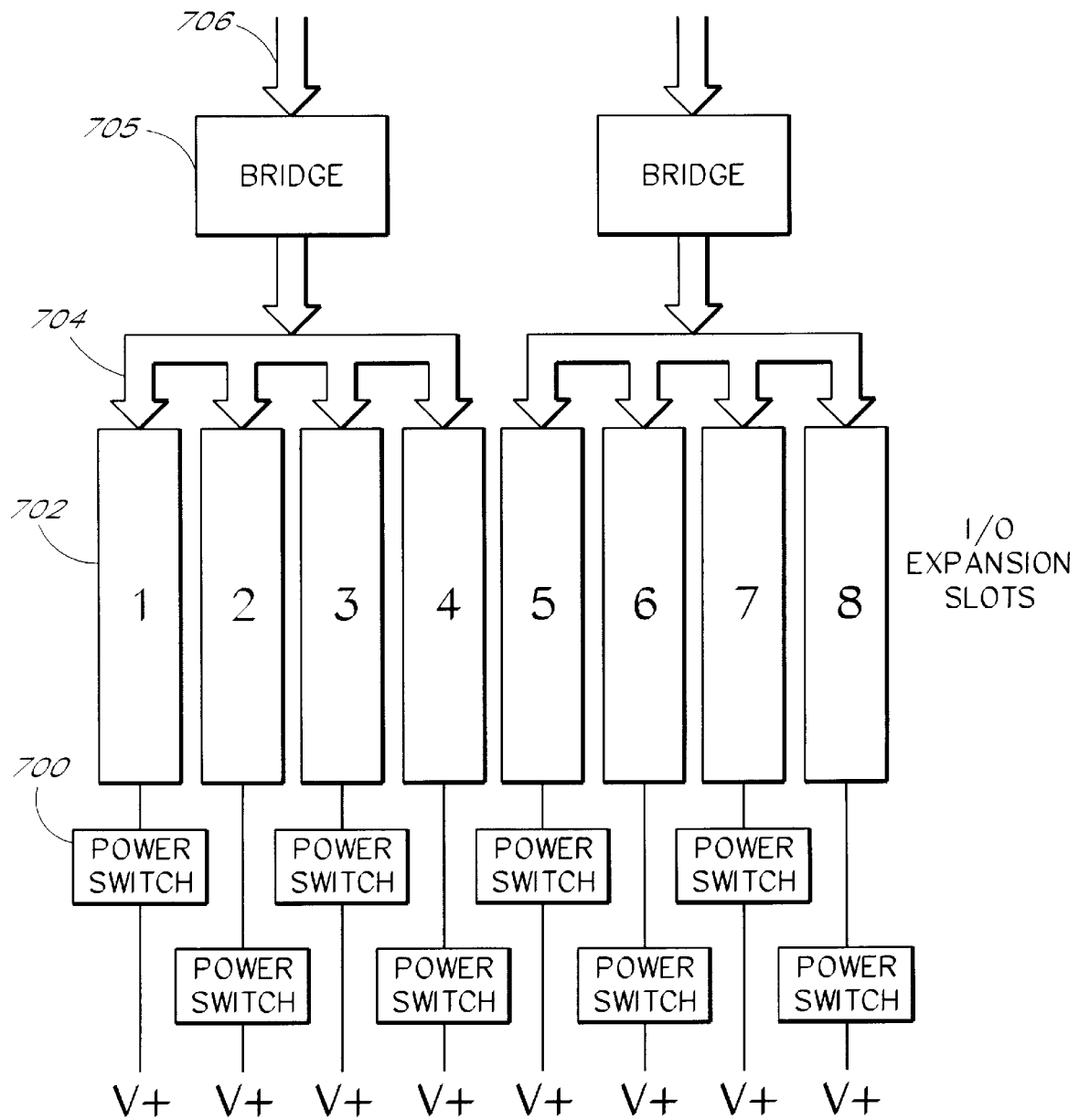
FIG. 7 illustrates an I/O expansion slot arrangement and bus configuration of a server computer.

FIG. 7 illustrates an I/O expansion slot arrangement and bus configuration for the server computer 204. The server computer 204 has eight I/O expansion slots 702.

Each I/O expansion slot 702 connects to a slot bus 704 which connects through a bridge 705 to a main bus 706. A power switch 700 regulates voltage provided to each I/O expansion slot 702.

As shown in FIG. 7, one embodiment assigns to each I/O expansion slot 702 a unique number from 1-8. Thus, each I/O expansion slot 702 is uniquely identified to permit software, firmware, or a network administrator to unambiguously direct commands or queries to a desired I/O expansion slot 702. The SNMP extension agent 210 may direct commands or queries to an I/O expansion slot 702.

A software module, including the SNMP extension agent 210, may also control the power switch 700 by issuing power down or power up commands to the switch respectively causing the power switch 700 to start or stop providing voltage to the I/O expansion slot 702. Alternatively, a manual switch may control the power to each slot.

Each I/O expansion slot 702 may accept a card or adapter. The card or adapter may comprise any type of computer adapter. In one embodiment, an I/O expansion slot 702 accepts a device control card (e.g., a SCSI adapter). In another embodiment, the I/O expansion slot 702 accepts a network communication card (e.g., an ethernet adapter card).

The slot bus 704 channels the input and output of data to and from an adapter card in the I/O expansion slot 702. In one embodiment, the slot bus 704 is configured to operate under the PCI (peripheral component interconnect) standard. However, the present invention is not limited by any bus.

In a step 604 (See FIG. 6), the network administrator views the displayed information regarding empty I/O expansion slots and selects an empty I/O expansion slot 702 in which to hot add an adapter card. The network administrator then directs Maestro 208 to initiate the hot add operation. In a further step 606, Maestro 208 uses the slotPowerState MIB variable to generate an SNMP request (or simply request) of the type SET_REQUEST to shut off the power to the selected slot. In one embodiment, the request includes the MIB variable of 1.3.6.1.4.1.837.2.4.1.1.6.1.3 (referencing the power state of the third I/O expansion slot of the first (and only) group of eight slots) and the value of 2 (power state: OFF) to request that power be shut off to the third I/O expansion slot of the server computer 204. In the step 606, Maestro issues the request to the server computer 204 over the network 200.

In a further step 608, the SNMP extension agent 210 receives the request to shut off power to the selected I/O expansion slot. The SNMP extension agent calls the Intrapulse manager 220 and passes to it a parameter identifying the selected slot and a value corresponding to the desired power state (i.e., shut off power). The Intrapulse manager 200 accesses memory reserved for the selected slot (in one embodiment, reserved memory is accessed using a fixed base address plus an offset indicated by the passed identification parameter), and the Intrapulse manager 200 alters the value of a register in the accessed memory area, the alteration causing a power switch 700 connected to the selected I/O expansion slot to shut off power to the slot. The Intrapulse manager 220 returns a completion code to the SNMP extension agent 210 which, in turn, transmits a completion response message to the client computer 202.

In still a further step 610, Maestro receives the completion response message and prompts the network administrator (e.g., by displaying a message on the monitor of the client computer) to physically install the adapter in the selected I/O expansion slot of the server computer 204. In a next step 612, the network administrator installs the adapter card in the selected I/O expansion slot. The network administrator loads and configures a device driver to service the added adapter if such a driver is not already loaded and configured on the server computer 204. In another embodiment, the MIB variables include information matching a device driver to the added adapter as well as information to load and to configure the device driver, thus permitting Maestro 208, rather than the network administrator, to load and configure a device driver to service the added adapter. The network administrator then directs Maestro 208 to complete the hot add operation (e.g., by using a mouse to click a command button displayed by Maestro 208 and labelled "OK" or "Next").

In a step 614, Maestro generates a request to restore power to the selected slot, the request including, in one embodiment, the MIB variable 1.3.6.1.4.1.837.2.4.1.1.6.1.3 (again referencing the power state of the third I/O expansion slot of the first group of eight slots) and the value of 1 (power state: ON) to request that power be resumed to the third I/O expansion slot of the server computer 204. Maestro 208 sends the request over the network 200 to the server computer 204.

In another step 616, the SNMP extension agent 210 receives the request to restore power to the I/O expansion slot and calls the Intrapulse manager 220 passing it parameters identifying the slot and the desired power state. Intrapulse manager 220 alters the appropriate register, restoring power to the slot. The SNMP extension agent 210 generates a completion response message and sends it to the client computer 202.

In a step 618, Maestro 208 executes the retrieve_data routine to update the hot plug MIB variables. After the retrieve_data routine finishes, Maestro 208 examines the hot plug MIB variable adapterState (now updated and stored locally in computer readable media of the client computer 102) to verify that the added adapter and its driver are operating normally. In one embodiment, the adapterState variable is 1.3.6.1.4.1.837.2.2.1.1.4.3 (referencing the state of the adapter and driver for adapter number 3). The value corresponding to this variable may indicate that the adapter and its device driver are operating normally (e.g., value=4) whereupon Maestro 208 notifies the network administrator that the hot add operation completed successfully. If the value corresponding to the adapterState variable indicates other than successful completion, Maestro 208 notifies the network administrator that the hot add operation was not successful. The network administrator can take remedial action, including performing a hot swap operation as described below.

Figure 8:
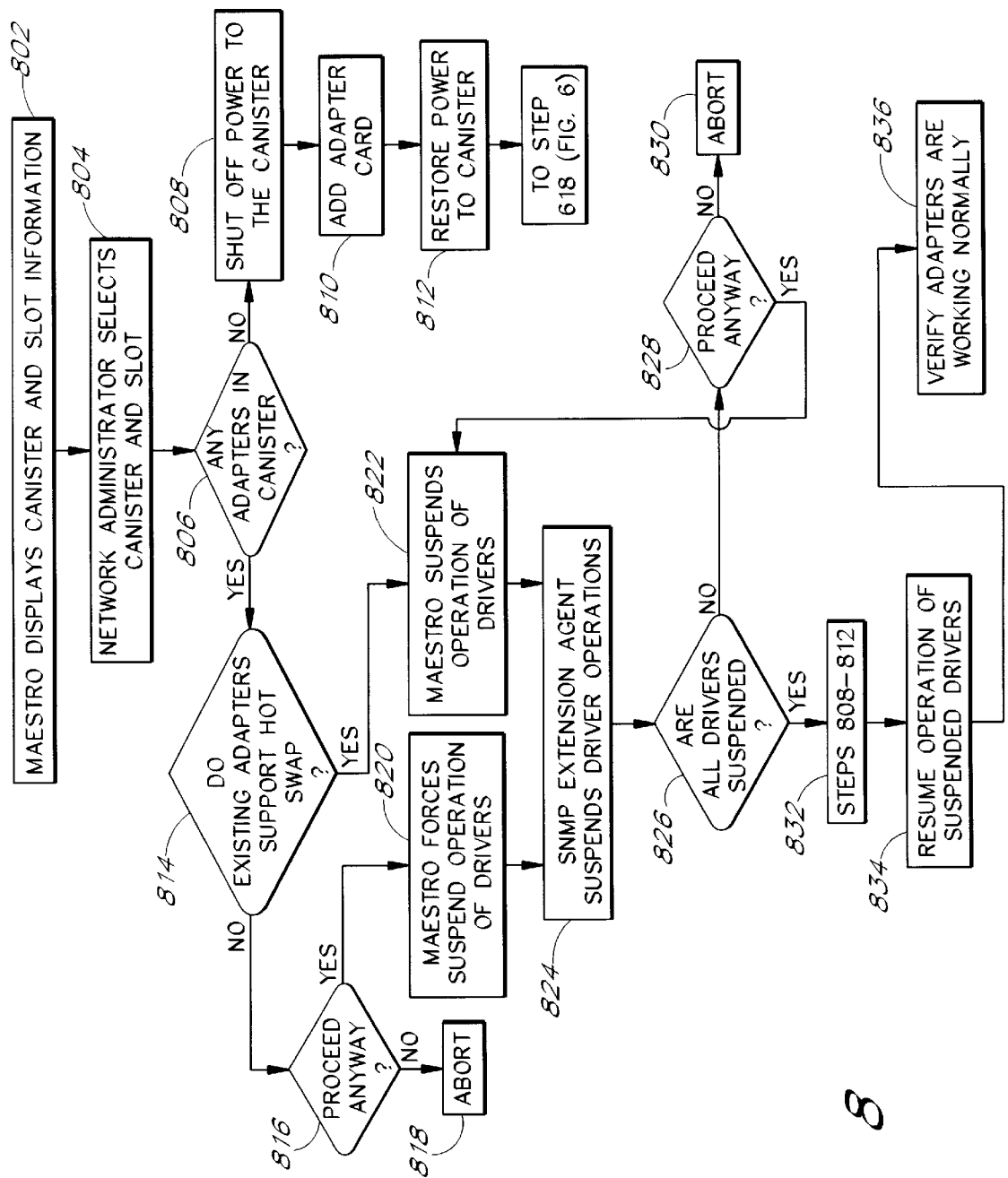
FIG. 8 illustrates one sequence of steps performed to hot plug an adapter to a server computer having canisters.

FIG. 8 illustrates steps performed in hot adding an adapter card to a server computer 204 having canisters (i.e., in one embodiment, a canister has multiple I/O expansion slots, the slots not capable of being powered down individually, the canister is removable and power to the canister may be set on or off by software or by physical manipulation). In a first step 802, Maestro 208 displays on a computer monitor of the client computer 202, viewed by a network administrator, I/O expansion slot and canister information extracted from hot plug MIB variables 212.

Figure 9:
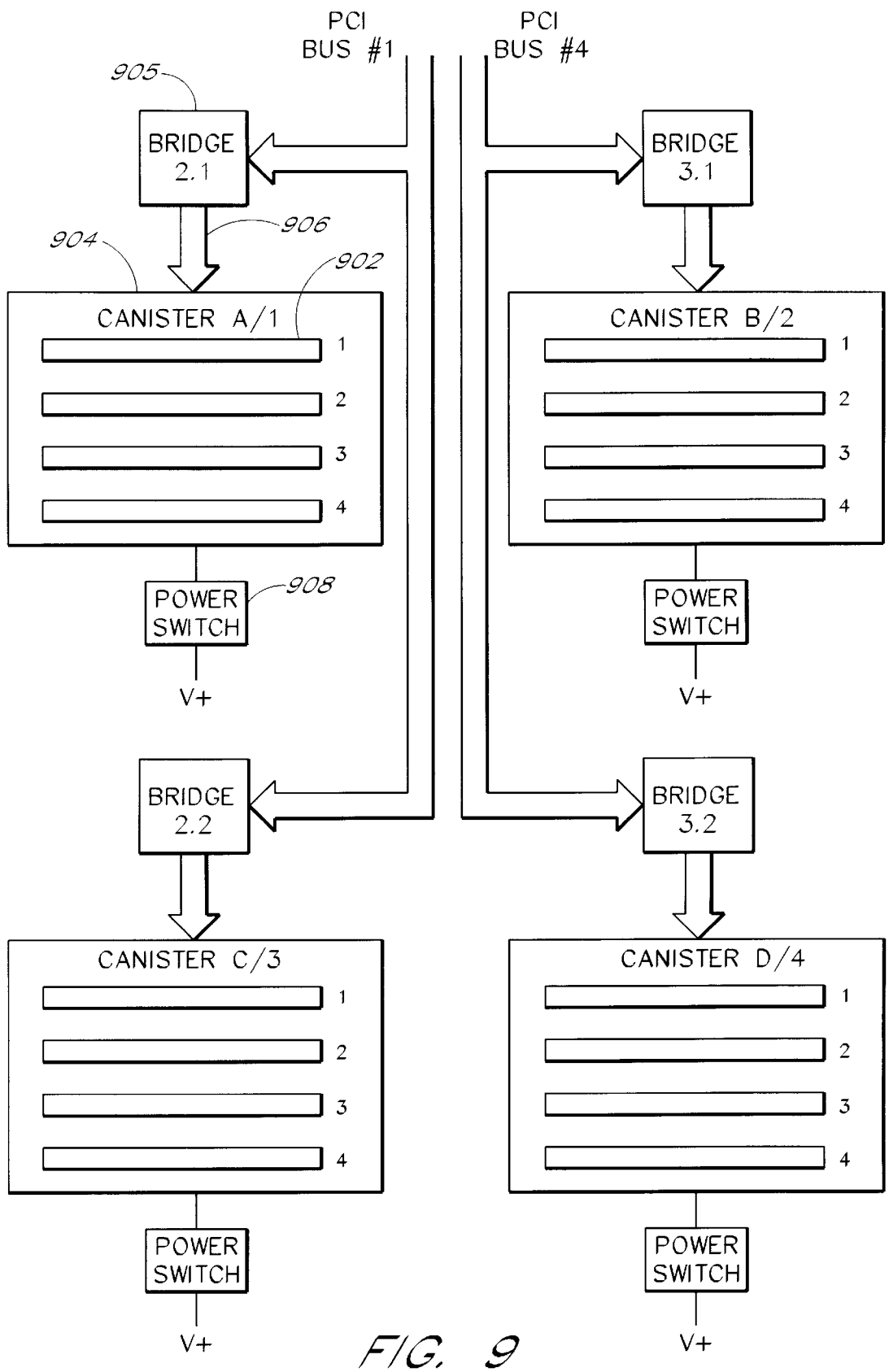
FIG. 9 illustrates an I/O expansion slot arrangement and bus configuration of a server computer having canisters.

FIG. 9 illustrates an I/O expansion slot arrangement and bus configuration for a server computer having four canisters 904, each of which supports up to 4 I/O expansion slots 902. Each slot 902 may accept a card or adapter. A slot bus (not shown) connects each slot to a canister bus 906. The canister bus 906 provides input and output for adapters in any of the four I/O expansion slots 902 in the canister 904. The canister bus 906 and a main bus 900 connect at a bridge 905. The bridge 905 distributes data from the main bus 900 to each of the canister buses 906.

In one embodiment, the four canisters are named "A", "B", "C", and "D" respectively, starting with "A" at the upper-left corner and proceeding in a clockwise rotation. Each slot is numbered 1-4 respectively, moving from top-to-bottom in a canister. The named canisters and numbered slots provide unique identification for software modules to address the canisters and slots. A power switch 908 regulates power to a canister 904, each canister 904 having a power switch 908. The power switch 908 can be controlled by software.

In a next step 804 (see FIG. 8), the network administrator selects a canister and an empty I/O expansion slot within the canister in which to hot add an adapter. (e.g., the third slot in the second canister). In a next step 806, Maestro 208 determines whether any adapters currently exist in the selected canister. Maestro 208 makes this determination by accessing the slotAdapterPresence variable (e.g., 1.3.6.1.4.1.837.2.4.1.1.5.2.n, which references a variable representing the status of occupancy of a slot in the second canister, and where n represents the number of the slot 1–4 within the second canister). Maestro 208 examines the slotAdapterPresence for each slot in the canister. If, in the step 806, Maestro 208 determines there are no adapters currently in any slots of the selected canister, then, in a step 808, Maestro 208 generates a request to shut off the power to the selected canister. Maestro 208 uses the canisterPowerState MIB variable (e.g., 1.3.6.1.4.1.837.2.5.2.1.6.2— referencing the power state of the second canister) and a value=2 (i.e., Power OFF) to generate the request. Maestro 208 sends the power shutoff request over the network 200 to the server computer 204.

The SNMP extension agent 210 receives the power shutoff request. The SNMP extension agent 210 calls the Intrapulse manager 220 passing parameters identifying the selected canister and indicating the desired state of power to the canister (i.e., shut off). The Intrapulse manager 220 accesses reserved memory corresponding to registers related to the canisters in the server computer 204 and sets the value of a register in that reserved memory, the setting of the register causing power to be shut off to the selected (e.g., second) canister. The Intrapulse manager 220 returns a successful completion code. The SNMP extension agent 210 sends a successful completion response message to the client computer 202.

In a next step 810, Maestro 208 prompts the network administrator to add an adapter to the selected empty I/O expansion slot of the selected canister. The network administrator then physically adds an adapter to the selected slot of the selected canister. The network administrator loads a device driver for the adapter on the server computer 204 if the device driver is not already on the server computer 204, and the network administrator configures the device driver to service the adapter if the device is not already configured to do so. One of ordinary skill in the art will recognize that Maestro 208 (or other management software module) may, with an appropriate set of hot plug MIB variables, determine a device driver for the adapter, locate that device driver, load the device driver if it is not already loaded, and configure the device driver to service the adapter if it is not already so configured. The network administrator then indicates to Maestro 208 that an adapter card has been added.

In a further step 812, Maestro 208 generates a request to restore power similar to the power shutoff request generated in the step 808, different only in that the power state is requested to be on. Thus, the value of 1 (i.e., power ON) is combined with the canisterPowerState MIB variable (e.g., 1.3.6.1.4.1.837.2.5.2.1.6.2) to generate an SNMP request of the type SET_REQUEST. Maestro 208 sends the request to the server computer 204. The SNMP extension agent 210 receives the power on request and calls the Intrapulse manager 220 to restore power to the canister. When Maestro 208 receives the completion message indicating that power has been resumed to the canister, the verification step 618 as described in relation to FIG. 6, is performed.

If, in the step 806, Maestro 208 determines that at least one adapter exists in the selected canister, then Maestro 208 accesses the hot plug MIB variables 212 to determine whether all adapters existing in the canister support hot swap operations. Maestro 208 accesses the MIB variable adapterSupportHotSwapHotAdd (e.g., 1.3.6.1.4.1.837.2.2.1.1.3.n where n=logical number of adapter, referencing the capability of an adapter to support hot swap operations) to determine, in a further step 814, whether each adapter in the canister supports hot swap operations.

If at least one adapter does not support hot swap, then Maestro 208, in a step 816, warns the network administrator that one of the adapters in the canister does not support hot swap operations. Maestro 208 then, in the step 816, queries the network administrator whether to proceed anyway. If the network administrator decides not to proceed, then, in a step 818, the hot add process aborts.

If, in the step 816 the network administrator decides to proceed, then, in a step 820, Maestro 208 generates a request to force suspended operation of device drivers servicing the adapters existing in the selected canister. Maestro 208 uses the hot plug MIB variable adapterCommand (e.g., 1.3.6.1.4.1.837.2.2.1.1.5.n where n is the logical number of the selected adapter) and the value 3 (Force Suspend) to issue the force suspended operations request. Note, that under some operating systems, such as Windows NT, an adapter may be hot swapped when a device driver servicing the adapter can be suspended and resumed.

If, in the step 814, Maestro 208 determines that all adapters existing in the selected canister support hot swap operations, then, in a step 822, Maestro 208 uses the adapterCommand MIB variable to generate a request to suspend operation of any driver servicing any existing adapter in the selected canister. In a further step 824, the SNMP extension agent 210 receives the request to suspend operations and calls the configuration manager 218 to suspend operation of any drivers servicing existing adapters in the selected canister.

In a step 826 Maestro 208 generates one or more requests using the adapterState MIB variable to determine whether all drivers were suspended. Maestro 208 sends the requests to the server computer 204. The SNMP extension agent 210 receives the requests, makes respective calls to the configuration manager 218, and determines whether drivers servicing adapters in the selected canister were suspended, and generates response messages indicating whether drivers were suspended and sends those response messages to the client computer 202.

If, in the step 826, Maestro 208 determines from the response message sent by the SNMP extension agent 210, that all drivers were not suspended, then in a next step 828, Maestro 208 warns the network administrator that all drivers were not suspended and queries the network administrator whether to proceed anyway. If, in the step 828, the network administrator determines not to proceed, then in a further step 830, the hot add process aborts.

If, in the step 828, the network administrator decides to proceed anyway, then Maestro 208 again, in the step 822, issues requests to suspend device drivers servicing adapters in the selected canister. The steps 822-826 loop a minimum of five times as long as Maestro 208 determines that at least one device driver has not been suspended. At the end of the fifth iteration through the steps 822–826, Maestro 208, in the step 828, again warns the network administrator that not all device drivers were suspended. Programmatic branching from the step 828 repeats as described above.

If, in the step 826, all drivers were suspended, then in a step 832 the steps as described in 808–812 are performed. In a next step 834, Maestro 208 generates a request to resume operations on the suspended drivers. To generate that request, Maestro 208 utilizes the hot plug MIB variable adapterCommand. Maestro 208 sends the resume operations request to the server computer 204.

The SNMP extension agent 210 receives the resume operation request and calls the configuration manager 218 requesting that drivers associated with the adapters in the canister be resumed. The configuration manager 218 returns a successful completion code upon resuming the operation of the suspended drivers. The SNMP extension agent 210 sends a successful completion response message to the client computer 202. In a step 836, Maestro 208 verifies that the adapters in the selected canister are working normally according to the procedures described in step 618 (see FIG. 6) performed for each adapter in the selected canister.

Those of ordinary skill in the art will appreciate that the steps described in relation to FIG. 8 also perform hot swap operations on a server computer having canisters, the steps modified, however, as follows: steps 806–812 are not performed, and thus the step 814 of determining whether the adapters in the selected canister support hot swap operations occurs immediately after the step 804 wherein the network administrator selects a canister and I/O expansion slot with respect to which the hot swap operation will be performed.

Figure 10:
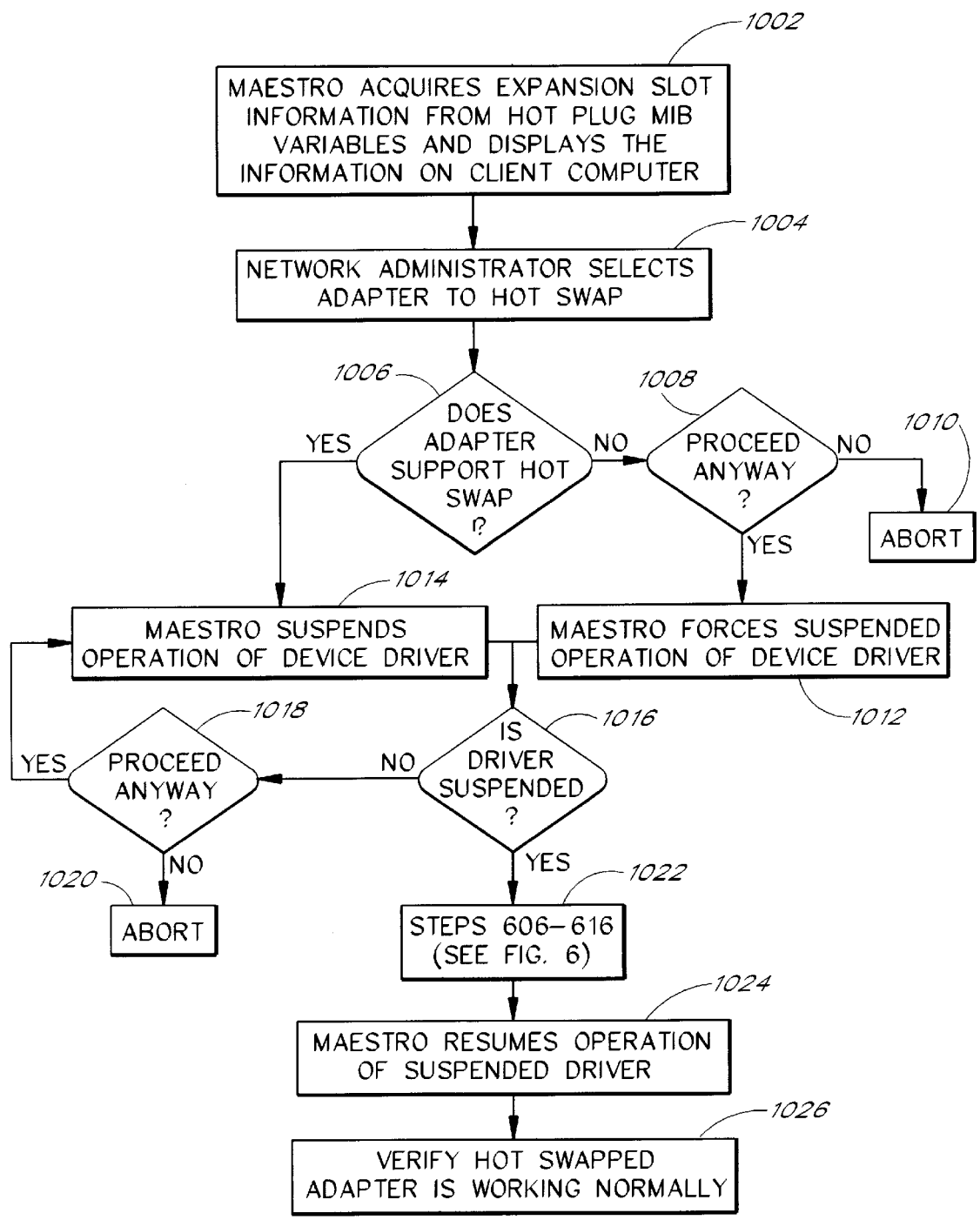
FIG. 10 illustrates one sequence of steps performed to hot swap an adapter to a server computer having canisters.

FIG. 10 illustrates steps performed to hot swap an adapter in a server computer that does not have canisters. In a first step 1002, Maestro 208 accesses adapter and I/O expansion slot information from the hot plug MIB variables 212 and displays information identifying the adapter cards in I/O expansion slots. The displayed information corresponds to the current configuration of the server computer 204.

In a next step 1004, the network administrator selects an adapter to hot swap. In a further step 1006, Maestro 208 accesses the hot plug MIB variable adapterSupportHotSwapHotAdd (e.g., 1.3.6.1.4.1.837.2.2.1.1.3.n where n=logical number of adapter, referencing the capability of an adapter to support hot swap operations) to determine whether the selected adapter supports hot swap operations. If the adapter does not support hot swap operations, then in a further step 1008, Maestro 208 warns the network administrator that the adapter does not support hot swap operations and queries the network administrator whether to proceed anyway. If, in the step 1008, the network administrator decides not to proceed, then, in a step 1010, the hot swap procedure aborts.

If, in the step 1008, the network administrator decides to proceed, then, in a further step 1012, Maestro 208 generates a request to force suspended operation of the device driver servicing the selected adapter. Maestro 208 uses the hot plug MIB variable adapterCommand (e.g., 1.3.6.1.4.1.837.2.2.1.1.5.n where n is the logical number of the selected adapter) and the value 3 (Force Suspend) to issue the force suspended operations request. The SNMP extension agent 210 receives the request and performs the force suspend operation by calling the configuration manager 218. The configuration manager 218 returns a completion code, and the SNMP extension agent 210 sends a successful completion response message to the client computer 202.

If, in the step 1006, Maestro 208 determines that the adapter does support hot swap operations, then, in a step 1014, Maestro 208 uses the adapterCommand hot plug MIB variable to generate a request to suspend operation of the device driver servicing the selected adapter. The SNMP extension agent 210 receives the request and calls the configuration manager 218 to perform the suspension. The SNMP extension agent 210 sends a successful completion response message to the client computer 202.

In a further step 1016, Maestro 208 uses the hot plug MIB variable adapterState to determine whether the adapter was suspended. Maestro 208 sends the request to the server computer 204 where the SNMP extension agent 210 receives the request and calls the configuration manager 218. The configuration manager 218 tests the state of the device driver and returns a code to the SNMP extension agent 210 indicating the state of the device driver (e.g., suspended or operating). The SNMP extension agent 210 generates a response message indicating whether the device driver is suspended and sends the response message to the client computer 202.

In the step 1016, if Maestro determines that the device driver was not suspended (by examining the response message), then, in a next step 1018, Maestro 208 warns the network administrator that the device driver was not suspended and queries the network administrator whether to proceed anyway. If, in the step 1018, the network administrator determines not to proceed, then, in a next step 1020, the hot swap procedure aborts.

If, in the step 1018, the network administrator determines to proceed even though the device driver was not suspended, the steps 1014 and 1016 loop a minimum of five times as long as Maestro 208 determines that the device driver has not suspended. Programmatic branching repeats at step 1018 as described above.

If Maestro 208 determines, in the step 1016, that the device driver was suspended, then, in a step 1022, each of the steps 606–616 (See FIG. 6) is performed (describing detailed steps for shutting down power to the selected I/O expansion slot, placing an adapter in the expansion slot, and restoring power to the selected I/O expansion slot; the only difference being that after power shuts off to the I/O expansion slot, the existing adapter is removed before placing a different adapter in the expansion slot).

In a step 1024, Maestro generates a request to resume operations on the suspended device driver. Maestro 208 uses the adapterCommand MIB variable to generate that request. Maestro 208 sends the request to the server computer 204. The SNMP extension agent receives the resume operation request and calls the configuration manager 218 to resume operation of the identified device driver. The configuration manager 218 returns a successful completion code upon resuming the operation of the driver. The SNMP extension agent 210 sends a successful completion response message to the client computer 202. In a step 1026, Maestro 208 verifies that the newly added adapter and device driver are working normally according to the procedure described in step 618 (see FIG. 6).

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

Appendix A

Incorporation by Reference of Commonly Owned Applications

The following patent applications, commonly owned and filed Oct. 1, 1997, are hereby incorporated herein in their entirety by reference thereto:

| Title | Application No. | Attorney Docket No. |
|---|---|---|
| "System Architecture for Remote Access and Control of Environmental Management" | 08/942,160 | MNFRAME.002A1 |
| "Method of Remote Access and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Distributed Processor System" | 08/942,448 | MNFRAME.005A2 |
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |
| "Hot Add of Devices Software Architecture" | 08/942,309 | MNFRAME.006A1 |
| "Method for The Hot Add of Devices" | 08/942,306 | MNFRAME.006A2 |
| "Hot Swap of Devices Software Architecture" | 08/942,311 | MNFRAME.006A3 |
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the Hot Add of a Mass Storage Adapter on a System Including a Dynamically Loaded Adapter Driver" | 08/962,963 | MNFRAME.006A8 |

-continued

| Title | Application No. | Attorney Docket No. |
|---|---|---|
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a System Including a Dynamically Loaded Adapter Driver" | 08/942,458 | MNFRAME.006A12 |
| "Method of Performing an Extensive Diagnostic Test in Conjunction with a BIOS Test Routine" | 08/942,463 | MNFRAME.008A |
| "Apparauts for Performing an Extensive Diagnostic Test in Conjunction with a BIOS Test Routine" | 08/942,163 | MNFRAME.009A |
| "Configuration Management Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 08/942,333 | MNFRAME.020A |
| "Method of Resetting a Server" | 08/942,405 | MNFRAME.021A |
| "System for Displaying Flight Recorder" | 08/942,070 | MNFRAME.022A |
| "Method of Displaying Flight Recorder" | 08/942,068 | MNFRAME.023A |
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Graphical User Interface" | 08/943,357 | MNFRAME.028A |
| "Display of System Information" | 08/942,195 | MNFRAME.029A |
| "Data Management System Supporting Hot Plug Operations on a Computer" | 08/942,129 | MNFRAME.030A |
| "Alert Configurator and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |
| "Computer Fan Speed Control System Method" | 08/941,267 | MNFRAME.035A |
| "Black Box Recorder for Information System Events" | 08/942,381 | MNFRAME.036A |
| "Method of Recording Information System Events" | 08/942,164 | MNFRAME.037A |
| "Method for Automatically Reporting a System Failure in a Server" | 08/942,168 | MNFRAME.040A |
| "System for Automatically Reporting a System Failure in a Server" | 08/942,384 | MNFRAME.041A |
| "Expansion of PCI Bus Loading Capacity" | 08/942,404 | MNFRAME.042A |
| "Method for Expanding PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |

-continued

| Title | Application No. | Attorney Docket No. |
|---|---|---|
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automatically Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 08/942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

What is claimed is:

1. A method for managing the configuration of a computer, said method comprising the acts of:

extending a management information base module to include a plurality of variables, said variables selected to support adding a component to said computer while said computer runs, removing a component from said computer while said computer runs, and exchanging components of said computer while said computer runs, said management information base module stored on a computer readable medium;

compiling the management information base module to generate a binary management information base; and generating a hot plug management information base table on a computer readable medium, said hot plug management information base table including variable data corresponding to variables defined in said management information base module, the variable data representing capabilities, characteristics or states of components of said computer.

2. The method as described in claim 1, wherein said variables include a power state variable for regulating power supplied by said computer to a component of said computer, the method comprising the further acts of:

collecting power state variable data for said component; and storing power state variable data in said management information base.

3. The method as described in claim 2, comprising the further act of:

responding, with agent software running on said computer, to a power state command by determining a current power state of said component, by causing said computer to stop providing power to said component, or by causing said computer to start providing power to said component, said power state command related to said power state variable.

4. The method as described in claim 3, wherein said act of collecting power state variable data includes collecting power state variable data for an I/O expansion slot, and wherein, in said act of responding, said agent software determines a current power state of said I/O expansion slot, causes a computer to stop providing power to said I/O expansion slot, or causes a computer to start providing power to said I/O expansion slot.

5. The method as described in claim 1, wherein said variables include a component state variable for suspending and resuming operation of a component of said computer, the method comprising the further acts of:

collecting component state variable data for said component; and storing component state variable data in said management information base.

6. The method as described in claim 5, comprising the further act of:

responding, with agent software running on said computer, to a component state command by suspending operation of said component or by resuming operation of said component.

7. The method as described in claim 6 wherein said act of collecting includes collecting component state variable data for a device driver, and wherein, in said act of responding, said agent software suspends or resumes the operation of a device driver running on said computer.

8. The method as described in claim 1, wherein said variables include a component command variable for configuring or changing an operational state of a component, the method comprising the further acts of:

collecting component command variable data for said component; and storing component command variable data in said management information base.

9. The method as described in claim 8, comprising the further act of:

responding, with agent software running on said computer, to a component command by configuring or changing the operating state of said component, said component command related to said component command variable.

10. The method as described in claim 9, wherein said act of collecting includes collecting adapter card command variable data, and wherein, in said act of responding, said agent software configures or changes the operational state of an adapter card.

11. A method for managing hot plug data to hot add or hot swap components of a computer, said method comprising the acts of:

selecting a plurality of variables, said variables selected to support adding a component to said computer while said computer runs, removing a component from said computer while said computer runs, and exchanging components of said computer while said computer runs, said variables stored on a computer readable medium; and collecting in a computer readable medium, hot plug variable data representing capabilities, characteristics or states of components of said computer, said hot plug variable data related to said plurality of variables.

12. The method as defined in claim 11, wherein said variables include a power state variable for examining or regulating the power state of a first component of said computer, the method comprising the further acts of:

collecting power state variable data for said first component of said computer; and storing said power state variable data in a computer readable medium.

13. A method for managing hot plug data to hot add or hot swap components of a computer, said method comprising the acts of:

selecting a plurality of variables, said variables selected to support adding a component to said computer while said computer runs, removing a component from said computer while said computer runs, and exchanging components of said computer while said computer runs, said variables stored on a computer readable medium;

collecting in a computer readable medium, hot plug variable data representing capabilities, characteristics or states of components of said computer, said hot plug variable data related to said plurality of variables, wherein said variables include a power state variable for examining or regulating the power state of a first component of said computer;

collecting power state variable data for said first component of said computer;

storing said power state variable data in a computer readable medium; and responding to a power state command by determining the power state of said first component, by shutting off power to said first component, or by starting power to said first component, said power state command including a representation of said power state variable.

14. The method as described in claim 13, comprising the further acts of:

compiling a management information base module defining a power state variable to generate a compiled management information base; and storing said compiled management information base on said computer.

15. A method for managing hot plug data to hot add or hot swap components of a computer, said method comprising the acts of:

selecting a plurality of variables, said variables selected to support adding a component to said computer while said computer runs, removing a component from said computer while said computer runs, and exchanging components of said computer while said computer runs, said variables stored on a computer readable medium;

collecting in a computer readable medium, hot plug variable data representing capabilities, characteristics or states of components of said computer, said hot plug variable data related to said plurality of variables, wherein said variables include a component state variable for suspending or resuming operation of a second component of said computer;

collecting component state variable data for said second component of said computer; and storing said component state variable data in said computer readable medium.

16. The method as described in claim 15, said method comprising the further act of:

responding to a component state command by suspending the operation of said second component or by resuming the operation of said second component, said component state command including a representation of said component state variable.

17. The method as described in claim 16, comprising the further acts of:

compiling a management information base module defining a component state variable to generate a compiled management information base; and storing said compiled management information base on said computer.

18. A method for refreshing hot plug variables, wherein said hot plug variables are stored in a computer readable medium of a client computer, and wherein said hot plug variables include existing component variable data identifying at least one component of a server computer, said method comprising the acts of:

polling, at a predetermined time interval, at least one component of said server computer for new component variable data identifying said at least one component of said server computer; and refreshing said hot plug variables by storing said new component variable data in said computer readable medium of said client computer to supersede said existing component variable data.

19. A method for refreshing hot plug variables, wherein said hot plug variables are stored in a computer readable medium of a client computer, and wherein said hot plug variables include existing component variable data identifying at least one component of a server computer, said method comprising the acts of:

polling, at a predetermined time interval, at least one component of said server computer for new component variable data identifying said at least one component of said server computer; and refreshing said hot plug variables by storing said new component variable data in said computer readable medium of said client computer to supersede said existing component variable data, wherein said hot plug variables include existing power state variable data describing the power state of at least one component of said server computer, wherein said act of polling includes polling at least one component for new power state variable data, and wherein said act of refreshing includes storing said new power state variable data to supersede said existing power state variable data stored on said computer readable medium of said client computer.

20. A method for refreshing hot plug variables, wherein said hot plug variables are stored in a computer readable medium of a client computer, and wherein said hot plug variables include existing component variable data identifying at least one component of a server computer, said method comprising the acts of:

polling, at a predetermined time interval, at least one component of said server computer for new component variable data identifying said at least one component of said server computer;

refreshing said hot plug variables by storing said new component variable data in said computer readable medium of said client computer to supersede said existing component variable data; and broadcasting said hot plug variables including said component variable data from said server computer to said client computer, said client computer having management software which accesses said broadcasted hot plug variables to control hot plug operations performed on said server computer.

21. The method as described in claim 20, comprising the further act of:

defining said hot plug variables in a management information base.

22. A method for refreshing hot plug variables, wherein said hot plug variables are stored in a computer readable medium of a client computer, and wherein said hot plug variables include existing component variable data identifying at least one component of a server computer, said method comprising the acts of:

polling, at a predetermined time interval, at least one component of said server computer for new component variable data identifying said at least one component of said server computer;

refreshing said hot plug variables by storing said new component variable data in said computer readable medium of said client computer to supersede said existing component variable data; and requesting, with a retrieve data routine running on said client computer, said hot plug variables including said component variable data from said server computer, wherein management software running on said client computer accesses said requested hot plug variables to control hot plug operations performed on said server computer.

23. A method for making hot plug variables available to a software module on a computer, wherein said hot plug variables are defined by a hot plug management information base, said method comprising the acts of:

storing on computer readable media on said computer, a binary hot plug management information base, said binary hot plug management information base generated by compiling with a management information base compiler a hot plug management information base module, said hot plug management information base module defining hot plug variables selected to support adding a component to a computer while said computer runs, removing a component from said computer while said computer runs, and exchanging components of said computer while said computer runs, said hot plug variables including a power state variable for regulating the power state of at least one component of said computer and also including a component state variable for suspending or resuming the operation of at least one component of said computer; and accessing, with software running on said computer, data in said binary hot plug management information base.

24. A method for making hot plug variables available to a software module on a computer, wherein said hot plug variables are defined by a hot plug management information base, said method comprising the acts of:

storing on computer readable media on said computer, a binary hot plug management information base, said binary hot plug management information base generated by compiling with a management information base compiler a hot plug management information base module, said hot plug management information base module defining hot plug variables selected to support adding a component to a computer while said computer runs, removing a component from said computer while said computer runs, and exchanging components of said computer while said computer runs, said hot plug variables including a power state variable for regulating the power state of at least one component of said computer and also including a component state variable for suspending or resuming the operation of at least one component of said computer;

accessing with software running on said computer, data in said binary hot plug management information base;

storing said binary hot plug management information base on a second computer linked to said first computer by a network; and accessing data in said binary hot plug management information base with software running on said second computer which controls hot plug operations performed on said first computer.

25. A method for controlling, from a client computer, hot plug operations performed on a server computer, said method comprising the acts of:

preparing a hot plug management information base module defining hot plug management information base variables;

compiling said hot plug management information base module to generate a binary management information base module;

distributing said binary management information base module to a computer readable medium of said client computer and to a computer readable medium of said server computer;

polling components of said server computer to generate server-based hot plug management information base variable data stored on a computer readable medium of said server computer, said server-based hot plug management information base variable data related to said hot plug management information base variables defined in said hot plug management information base module;

refreshing client-based hot plug management information base variable data stored on a computer readable medium of said client computer by sending to said client computer said server-based hot plug management information base variable data;

generating with management software running on said client computer, a suspend device driver request related to a component state variable defined by said management information base module;

sending said suspend device driver request to agent software running on said server computer, said agent software responsively recognizing said suspend device driver request to suspend a device driver servicing a component of said server computer;

generating with management software running on said client computer, a power off request related to a power state variable defined by said management information base module;

sending said power off request to said agent software, said agent software responsively recognizing said power off request to stop power to a component of said server computer;

generating with management software running on said client computer, a power on request related to a power state variable defined by said management information base module;

sending said power on request to said agent software, said agent software responsively recognizing said power off request to start power to a component of said server computer;

generating with management software running on said client computer, a resume device driver request related to a component state variable defined by said management information base module; and sending said resume device driver request to agent software running on said server computer, said agent software responsively recognizing said resume device driver request to resume said device driver.

26. A method for updating hot plug data for a component connected to a computer, said method comprising the acts of:

preparing a management information base module defining hot plug variables for a class of components capable of connecting to a computer;

compiling said management information base module to generate a binary hot plug management information base;

connecting a component of said class of components to said computer;

preparing hot plug management information base variables in a computer readable medium of said computer, said hot plug management information base variables corresponding to said class of components;

polling said component to obtain hot plug management information base variable data for said component; and updating said hot plug management information base variables to contain said obtained hot plug management information base variable data.

* * * * *